(12) United States Patent
Jiang et al.

(10) Patent No.: US 12,128,629 B2
(45) Date of Patent: Oct. 29, 2024

(54) PRINTING METHOD AND PRINTING DEVICE

(71) Applicant: ZHUHAI SAILNER 3D TECHNOLOGY CO., LTD., Zhuhai (CN)

(72) Inventors: Wei Jiang, Zhuhai (CN); Wei Chen, Zhuhai (CN); Linting Xie, Zhuhai (CN)

(73) Assignee: ZHUHAI SAILNER 3D TECHNOLOGY CO., LTD., Zhuhai (CN)

( * ) Notice: Subject to any disclaimer, the term of this patent is extended or adjusted under 35 U.S.C. 154(b) by 124 days.

(21) Appl. No.: 16/890,873

(22) Filed: Jun. 2, 2020

(65) Prior Publication Data

US 2020/0290286 A1 Sep. 17, 2020

Related U.S. Application Data

(63) Continuation of application No. PCT/CN2018/086089, filed on May 9, 2018.

(30) Foreign Application Priority Data

Dec. 8, 2017 (CN) .......................... 201711312849.2
Jan. 31, 2018 (CN) .......................... 201810093197.6

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/209* (2017.08); *B29C 64/245* (2017.08);
(Continued)

(58) Field of Classification Search
CPC ................ B29C 45/561; B29C 64/209; B29C 45/14065; B29C 45/14073;
(Continued)

(56) References Cited

U.S. PATENT DOCUMENTS

2010/0033521 A1* 2/2010 Kritchman ............. B33Y 10/00
347/9
2017/0334141 A1* 11/2017 Burton .................. B29C 64/386

FOREIGN PATENT DOCUMENTS

CN 103634499 A 3/2014
CN 104325638 A 2/2015
(Continued)

OTHER PUBLICATIONS

Tyson ("What 3D Printer Nozzle Size Should I use?—The Pros and Cons . . . " Available Oct. 12, 2016). (Year: 2016).*
"Fabforma" (Layer height explained for 3d printing, Available Jul. 4, 2017, <http://www.fabforma.com/support/layer-height-3d-printing>) (Year: 2017).*
(Continued)

*Primary Examiner* — Michael A Tolin
*Assistant Examiner* — Hana C Page
(74) *Attorney, Agent, or Firm* — J.C. PATENTS

(57) ABSTRACT

A printing method and a printing device are provided. The printing method includes: determining, according to layer printing data of an object to be printed, a trip starting point and/or a trip ending point in a scanning direction for each trip of multiple trips required for a print head to print a preset layer, where the trip starting point and/or a trip ending point of at least one trip matches a contour of the object to be printed in the trip (S101); and performing layer printing for the preset layer according to the trips (S102).

6 Claims, 24 Drawing Sheets

(51) Int. Cl.
*B29C 64/245* (2017.01)
*B33Y 10/00* (2015.01)
*B33Y 30/00* (2015.01)
*B33Y 50/02* (2015.01)

(52) U.S. Cl.
CPC .............. *B33Y 10/00* (2014.12); *B33Y 30/00* (2014.12); *B33Y 50/02* (2014.12)

(58) Field of Classification Search
CPC ............. B29C 2045/14081; B29C 2045/1409; B29C 2045/14098; B29C 2045/14106; B29C 2045/14114; B29C 2045/14122; B29C 2045/14131; B29C 2045/14139; B29C 2045/14147; B29C 2045/14155; B29C 2045/14163; B29C 64/393; B29C 64/245
USPC ....................................................... 264/40.1
See application file for complete search history.

(56) References Cited

FOREIGN PATENT DOCUMENTS

| | | |
|---|---|---|
| CN | 105313337 A | 2/2016 |
| CN | 105799172 A | 7/2016 |
| CN | 106273447 A | 1/2017 |
| CN | 106985393 A | 7/2017 |
| CN | 107180451 A | 9/2017 |
| CN | 107584757 A | 1/2018 |
| JP | 2015193184 A | 11/2015 |
| JP | 2017109320 A | 6/2017 |
| WO | WO2001002160 A1 | 1/2001 |

OTHER PUBLICATIONS

First Office Action of Prior Chinese application No. 201810093197.6.
International Search Report for PCT/CN2018/086089.
First Office Action of the parallel application JP2020-530973.

* cited by examiner

PRINTING METHOD AND PRINTING DEVICE

CROSS-REFERENCE TO RELATED APPLICATIONS

This application is a continuation of International Application No. PCT/CN2018/086089, filed on May 9, 2018, which claims priority to Chinese Patent Application No. 201711312849.2, filed on Dec. 8, 2017, titled "3D Printing Method and Printing System Thereof", and Chinese Patent Application No. 201810093197.6, filed on Jan. 31, 2018, titled "Printing Method and Printing Device". All of the aforementioned patent applications are hereby incorporated by reference in their entireties.

TECHNICAL FIELD

The disclosure relates to the field of 3D inkjet printing, and in particular, to a printing method and a printing device.

BACKGROUND

3D Printing (3DP) technology, also known as Additive Manufacturing (AM) technology or Rapid Prototyping (RP) technology, is a three-dimensional construction technology based on the discrete-stacking principle, which slices a model into layers, prints layer by layer on a support platform and then stacks multiple layers to finally make a 3D object.

Usually, a process of making a 3D object mainly includes the steps of converting a model to be printed of a target 3D object into data in an STL data format or data in other data format that can be recognized by slicing software, slicing the model to be printed into layers and performing data processing by using the slicing software, and printing, by a print, layer by layer according to the obtained printing data. In the prior art, when slicing a model into layers by using the slicing software, firstly a minimum cuboid that can accommodate the model to be printed is determined, and then the minimum cuboid is sliced to form multiple slice layers, that is, the length, width and height of the minimum cuboid that accommodates the model to be printed are taken as boundary dimensions for slicing, and when slicing layers, the area of each slice layer is equal, that is, the length and width of each slice layer are equal to the length and width of the minimum cuboid that accommodates the model to be printed, and the thickness of the slice layer is not limited as long as the thickness of all slice layers is equal to the height of the minimum cuboid that accommodates the model. In this way, during actual printing, the printer moves according to the size of each slice layer, that is, when the printer prints layer by layer according to the obtained printing data, the movement trajectory of the printer is completely the same.

In the prior art, during the inkjet printing of a 3D inkjet printer with a printhead arranged in a multi-nozzle array, the movement mode of the printhead is that the printing platform moves along the X and Y axes relative to the printhead, and after one layer is completed, the printing platform moves to the origin and descends the height of one layer relative to the printhead, and then starts the printing of a new layer, repeating in this way to form a 3D printed object.

The problem caused by this is that in actual inkjet printing, the model to be printed is usually not a regular cuboid shape, which instead can be any other shapes. So, the printhead is located in a no-printing area on most of the slice layers during printing, resulting in low printing efficiency.

SUMMARY

The present disclosure provides a printing method and a printing device for 3D inkjet printing, which have high printing efficiency.

In a first aspect, the present disclosure provides a printing method, including:

determining, according to layer printing data of an object to be printed, a trip starting point and/or a trip ending point in a scanning direction for each trip of multiple trips required for a printhead to print a preset layer, where the trip starting point and/or the trip ending point of at least one trip matches a contour of the object to be printed in the trip;

performing layer printing for the preset layer according to the trips.

In a second aspect, the disclosure provides a printing device, including a printhead, a support platform and a control unit, where the control unit is electrically connected to the printhead, and the control unit is configured to perform the forgoing printing method, to cause the printhead to print an object to be printed on the support platform.

The printing method and the printing device of the present disclosure, the printing method specifically includes the following steps: firstly, determining a trip starting point and/or a trip ending point in a scanning direction for each trip of multiple trips required for a printhead to print a preset layer according to layer printing data of an object to be printed, where the trip starting point and/or the trip ending point of at least one trip matches a contour of the object to be printed in the trip; then performing layer printing for the preset layer according to the trips. In this way, when a single slice layer is printed, at least one of the trip starting point or the trip ending point of a printing trip matches the contour of the object to be printed in the trip, which can effectively reduce an overall length of the trip, and improve printing speed and printing efficiency.

BRIEF DESCRIPTION OF DRAWINGS

In order to explain the technical solutions in the embodiments of the present disclosure or in the prior art more clearly, the drawings used in the description of the embodiments or the prior art will be briefly introduced in the following. Obviously, the drawings described in the following are some embodiments of the present disclosure. For those of ordinary skill in the art, other drawings can also be obtained based on these drawings without any creative efforts.

DESCRIPTION OF EMBODIMENTS

To make the objectives, technical solutions and advantages of the embodiments of the present disclosure clearer, the technical solutions in the embodiments of the present disclosure will be described clearly and completely in conjunction with the drawings in the embodiments of the present disclosure. Obviously, the described embodiments are part of the embodiments of the present disclosure, but not all the embodiments. Based on the embodiments of the present disclosure, all other embodiments obtained by a person of ordinary skill in the art without creative efforts fall within the protection scope of the present disclosure.

Figure 1:
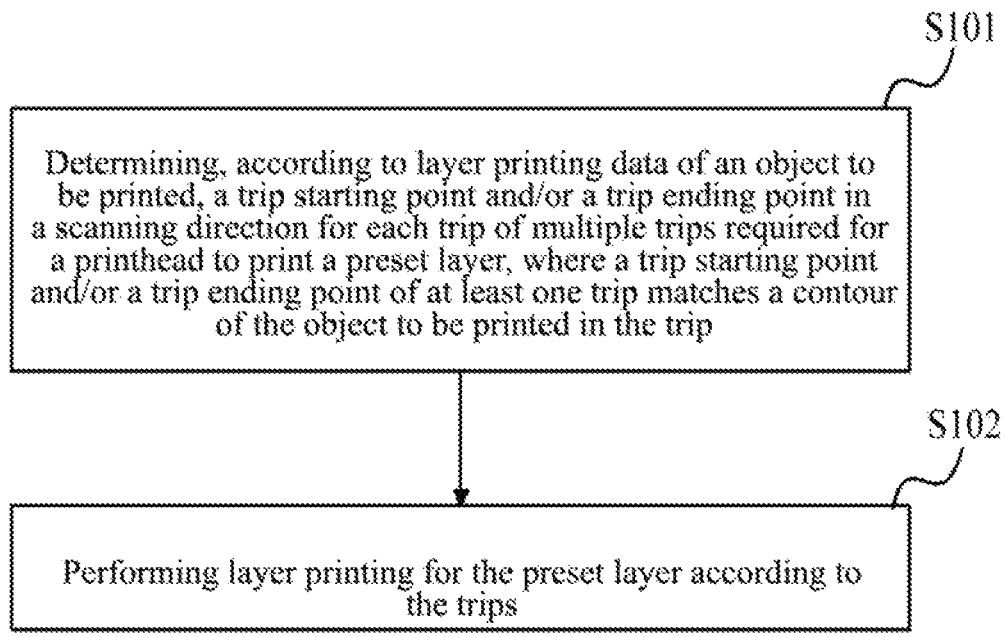
FIG. 1 is a schematic flowchart of a printing method provided by a first embodiment of the present disclosure.
Figure 2:
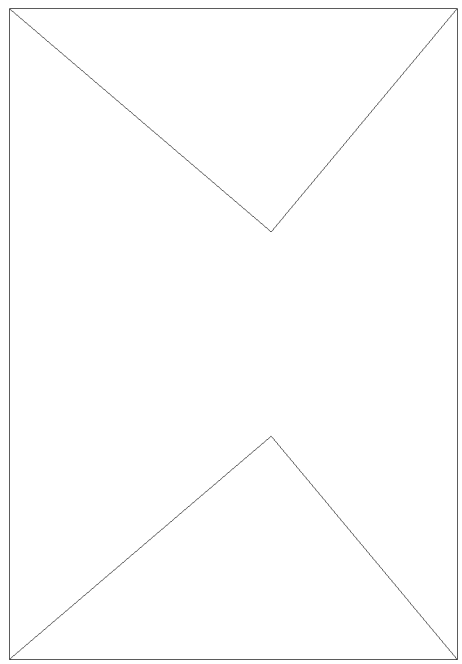
FIG. 2 is a schematic diagram of an object to be printed on a preset layer.

FIG. 1 is a schematic flowchart of a printing method provided by a first embodiment of the present disclosure. FIG. 2 is a schematic diagram of an object to be printed on a preset layer. As shown in FIG. 1 and FIG. 2, the printing method in this embodiment may specifically include the following steps:

S101, determining, according to layer printing data of an object to be printed, a trip starting point and/or a trip ending point in a scanning direction for each trip of multiple trips required for a printhead to print a preset layer, where the trip starting point and/or the trip ending point of at least one trip matches a contour of the object to be printed in the trip.

Specifically, when printing an object to be printed, firstly, the model of the object to be printed needs to be sliced into layers, and each slice layer includes a part of the object to be printed corresponding to the sliced layer, so that layer printing data of each slice layer can be obtained by performing data processing for each slice layer of the model, and printing can be performed according to the layer printing data.

After the layer printing data of the object to be printed corresponding to each slice layer is obtained, a trip of the printing head when printing the layer, that is, the preset layer, can be determined according to the layer printing data of each slice layer. Because a print length of the printhead itself is limited, the printhead needs to go through multiple scans to complete the printing process of this layer. Specifically, taking three-dimensional coordinate axes as an example, the X axis is a scanning direction, the Y axis is a stepping direction, and the Z axis is a layer stacking direction. The printing method is to move once along the X axis and print out a printing material in a place with a valid printing data point during the moving; after the printing of one line is completed, step in the Y-axis direction, and then move along the X-axis again to perform the printing process of another line, and repeat in this way to complete the printing of the slice layer. Then the printing platform descends a preset distance relative to the printhead, and the printing work of another slice layer is restarted, and finally a three-dimensional object to be printed is formed. Each moving process of the printhead along the X axis is a trip, and the starting point of the printhead during the moving is the trip starting point of the trip, and the ending point of the printhead during the moving is the trip ending point. Each trip of the printhead along the X axis needs to go through start, acceleration, constant speed, deceleration, and stop phases, and the print head operates at the constant speed phase. Therefore, for ease of understanding, the start, acceleration, deceleration and stop phases of the printhead are ignored in each trip described in the present disclosure, that is, the trip described in the present disclosure is regarded as a path traveled by the printhead in an operation along the scanning direction.

Therefore, after obtaining the layer printing data of the object to be printed, the multiple trips required for the printhead when printing the slice layer can be determined, where at least one of the trip starting points or the trip ending points of part or all of the trips is not the same as the starting points and ending points of the other trips, but is located at a position that matches or fits the contour of the object to be printed in the trip.

The trip starting point and/or the trip ending point of the trip matches the contour of the object to be printed in the trip; when the printhead is close to the printing plane, a distance between the two can be neglected, and it can be that the trip starting point and/or trip ending point coincide with the contour of the object to be printed in the trip; when the printhead is far away from the printing plane, due to the inertia of a material flying, the trip starting point and/or the trip ending point of the trip may be located near the contour of the object to be printed.

At this time, since at least one of the trip starting point and trip ending point of the trip matches the contour of the object to be printed in the trip, therefore, compared with the trip starting point and trip ending point of the trip and a cuboid containing the object to be printed in the conventional printing process, part of the path corresponding to an empty printing area is removed from the trip, and thus an overall length of the trip is reduced, which effectively improves printing speed and printing efficiency of the printhead when printing the slice layer.

S102, performing layer printing for the preset layer according to the trips.

After obtaining the multiple trips corresponding to the slice layer according to the layer printing data of the preset layer, the printhead can be driven to perform layer printing for the preset layer according to the obtained multiple trips.

In this way, printing a single slice layer can be completed by the above steps, and multiple printing layers formed by the slice layers can be stacked to form a three-dimensional object to be printed.

Therefore, when a single slice layer is printed, at least one of the trip starting point or the trip ending point of a printing trip in the scanning direction matches the contour of the object to be printed in the trip, which can effectively reduce an overall length of the trip, and improve printing speed and printing efficiency.

When the printhead is printing, positions of the trip starting point and the trip ending point of the trip in the scanning direction may be limited by many factors. For example, when the printhead is in a one-way printing mode, each trip is kept relatively independent of the previous trip, and the trip starting point and trip ending point of the trip are not affected by adjacent trips. At this time, in order to reduce the overall length of the trip, in an optional implementation, the trip starting point and the trip ending point can be matched with the contour of the object to be printed in the trip. In this way, the trip can use the positions matching the contour of the object to be printed in the trip as the trip starting point and the trip ending point, so that the trip can skip a blank printing area before and after the contour of the object to be printed in the scanning direction, thereby improving printing efficiency.

In another alternative implementation, due to the limitation of the printing mode of the printhead, the trip of the printhead cannot directly start from a position that matches the contour of the object to be printed. For example, when the printhead is in a two-way printing mode, each trip proceeds by moving directly in a stepping direction to start the printing process of this trip after the printing of the previous trip is completed and the printhead moves to the trip ending point of the previous trip. At this time, both the trip starting point and the trip ending point of the trip need to be determined by referring to the trip ending point of the previous trip of the trip or the trip starting point of the next trip of the trip, and cannot be determined only by the contour of the object to be printed. Therefore, optionally, for the trip starting point and trip ending point of the trip, the trip starting point of the trip is determined by a leading one of the contour of the object to be printed in the trip and the trip ending point of a previous trip of the trip in the scanning direction; and/or, the trip ending point of the trip is determined by a lagging one of the contour of the object to be printed in the trip and the trip starting point of a next trip of the trip in the scanning direction. At this time, for the trip starting point and the trip ending point of the trip, reference needs to be made to the positions of the trip starting point and the trip ending point of two adjacent trips, and the contour of the object to be printed in the trip is compared with the trip starting point or the trip ending point of the adjacent trips of the trip, to choose the ones that make the trip have a larger range in the scanning direction. In this way, the trip starting point and the trip ending point of the trip can be determined to avoid the occurrence of the phenomenon that the next trip cannot cover the contour of the object caused by the range formed by the trip starting point and the trip ending point of the trip being smaller than the range of the contour of the object in the next trip.

Figure 3:
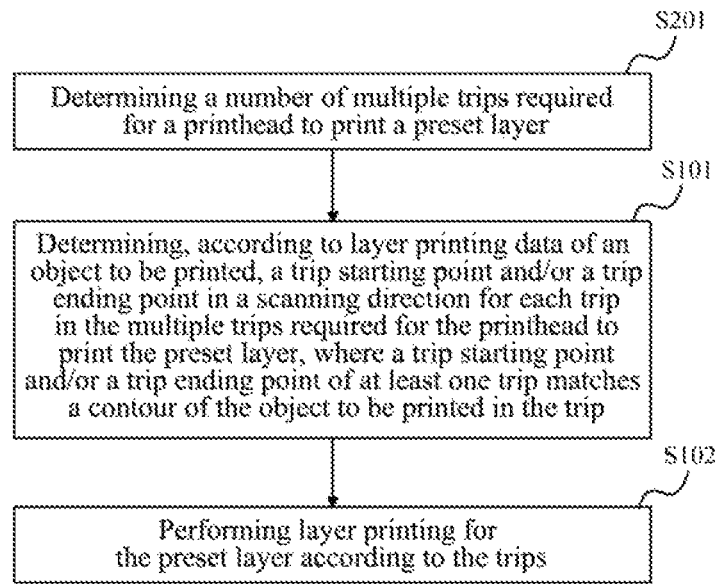
FIG. 3 is a schematic flowchart of another printing method provided by the first embodiment of the present disclosure.

FIG. 3 is a schematic flowchart of another printing method provided by the first embodiment of the present disclosure. As shown in FIG. 3, before determining trip starting points and/or trip ending points of the trips, a number of the trips of the printhead in the stepping direction and information such as a position and range of a single trip in the stepping direction may be determined according to the layer printing data of the object to be printed. Specifically, before the preceding step S101, that is, the determining, according to layer printing data of an object to be printed, a trip starting point and/or a trip ending point in a scanning direction for each trip of multiple trips required for a printhead to print a preset layer, the following steps may be further included:

S201, determining a number of the multiple trips required for the printhead to print the preset layer.

In this way, after obtaining the layer printing data of the object to be printed, the number of trips required for printing the preset layer can be determined for the preset layer according to a parameter of the printhead and a size of the preset layer. In this way, the layer can be divided according to the number of trips to obtain a trip range corresponding to each trip in the preset layer, and determine at least one of the trip starting point or the trip ending point according to the range of each trip.

When determining the number of trips, the number of trips can be obtained through different parameters according to different printing modes. For example, in a normal printing mode without performing supplementary printing, the step of determining the number of the multiple trips according to the layer printing data of the object to be printed specifically includes: determining the number of the multiple trips according to a length of the printhead in a stepping direction and a length of the preset layer in the stepping direction.

For example, when supplementary printing is not performed, on the basis of the length d of the printhead in the stepping direction, that is, along the Y axis, and the length D of the preset layer in the stepping direction, the number of trips can be determined as N=D/d, so that the number of trips can be obtained. When D/d is not an integer, N is an integer round-up of D/d; e.g., if D/d=1.2, then N=2.

In this way, after the number of trips is obtained, the trips can be divided according to the number of trips, so as to obtain the trip starting point and the trip ending point of each trip in the next step.

Further, in order to obtain at least one of the trip starting point and the trip ending point of the trip, various methods may be adopted for determination. In an optional implementation, step S101 specifically includes: determining the trip starting point and/or the trip ending point of the trip according to a range of an area having the contour of the object, that is, an area with a valid printing data point, in the scanning direction in each trip.

Since the object to be printed necessarily includes valid printing data points, it is possible to determine which area in the trip corresponds to the object to be printed by detecting the valid printing data points. And an area having the valid printing data point in the trip is a contour area corresponding to the object to be printed, and at least one of the trip starting point or the trip ending point of the trip can be determined according to the range of that area in the scanning direction.

After the trips for printing is obtain, the preset layer can be printed according to the trips. The printing process may be performed after trip data is generated, or may be performed during the generation of the trip data.

Printing the trip data after generating the trip data may specifically be, after generating the trip data of a trip, sending the trip data to the printhead to perform a printing step, and at the same time, performing the process of generating the next trip data. When performing a printing in the process of generating the trip data, the trip data is synchronously sent to the printhead to perform the printing step while the trip data of a trip is generated.

It should be noted that the trips in all the above steps may be different or the same. For example, when the slice layer is a cuboid, each trip on the slice layer is the same as each other, and when the slice layer is circular, irregular, etc., each trip on the slice layer is different from each other.

In this embodiment, the printing method may specifically include the following steps: firstly, determining, according to layer printing data of an object to be printed, a trip starting point and/or a trip ending point in a scanning direction for each trip of multiple trips required for a printhead to print a preset layer, where the trip starting point and/or the trip ending point of at least one trip matches a contour of the object to be printed in the trip; then performing layer printing for the preset layer according to the trips. In this way, when a single slice layer is printed, at least one of the trip starting point or the trip ending point of a printing trip matches the contour of the object to be printed in the trip, which can effectively reduce an overall length of the trip, and improve printing speed and printing efficiency.

Figure 4:
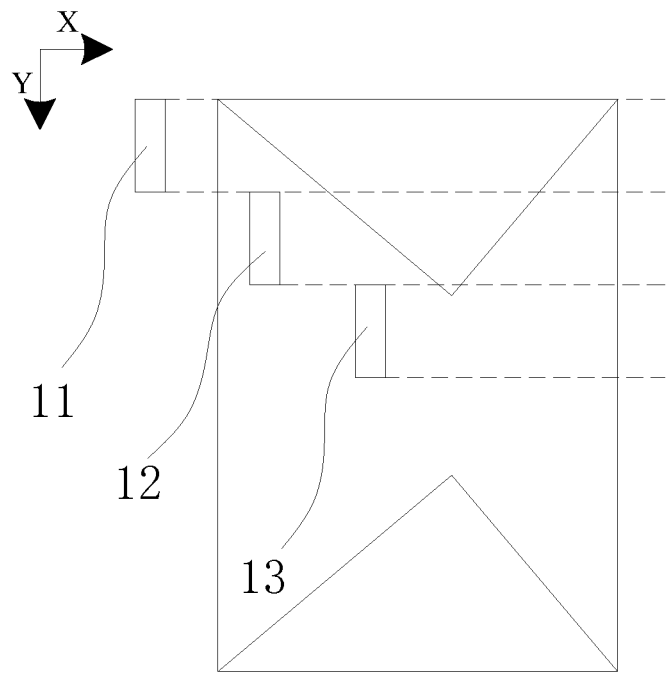
FIG. 4 is a schematic diagram of printing status when a printing method is performed, provided by a second embodiment of the present disclosure.

FIG. 4 is a schematic diagram of printing status when a printing method is performed, provided by a second embodiment of the present disclosure. As shown in FIG. 4, in this embodiment, the printhead performs a one-way printing function. At this time, after performing the printing process of each trip, the printhead will return to the side of the trip starting point, and the printing process will be performed again from this side for the next trip.

Specifically, when the printhead performs one-way printing, the printing of each trip will be performed a long the X-axis direction, that is, the scanning direction, and after the printing of each trip is completed, the printhead moves along the Y-axis direction, that is, the stepping direction, to the next trip to print. In this way, the printhead alternately reciprocates on the X axis and the Y axis, thereby completing the printing of the preset layer. Unless otherwise specified, the scanning direction of the printhead is the X-axis direction, that is, the horizontal direction along the paper surface, and the stepping direction is the Y-axis direction, that is, the vertical direction along the paper surface.

Figure 5A:
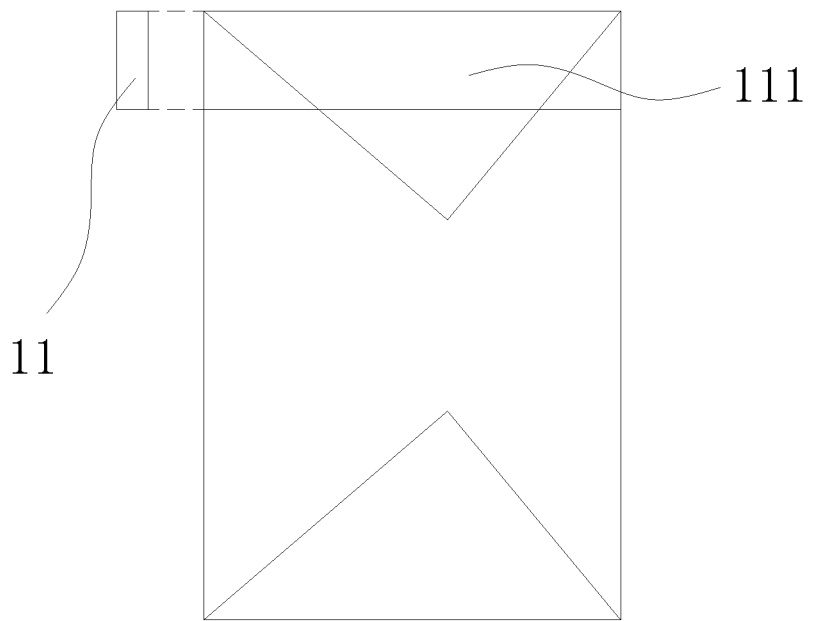
FIG. 5a is a schematic diagram of a first trip when one-way printing is performed, provided by the second embodiment of the present disclosure.
Figure 5B:
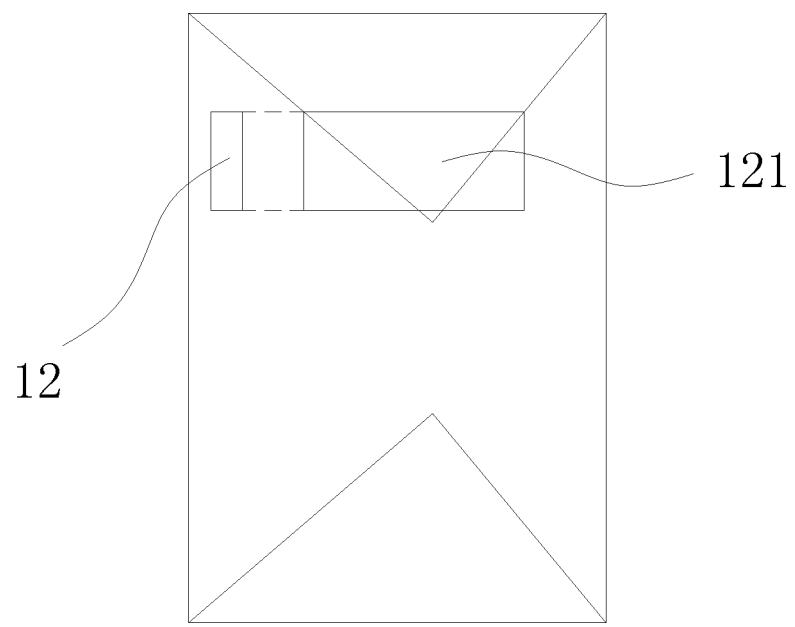
FIG. 5b is a schematic diagram of a second trip when one-way printing is performed, provided by the second embodiment of the present disclosure.
Figure 5C:
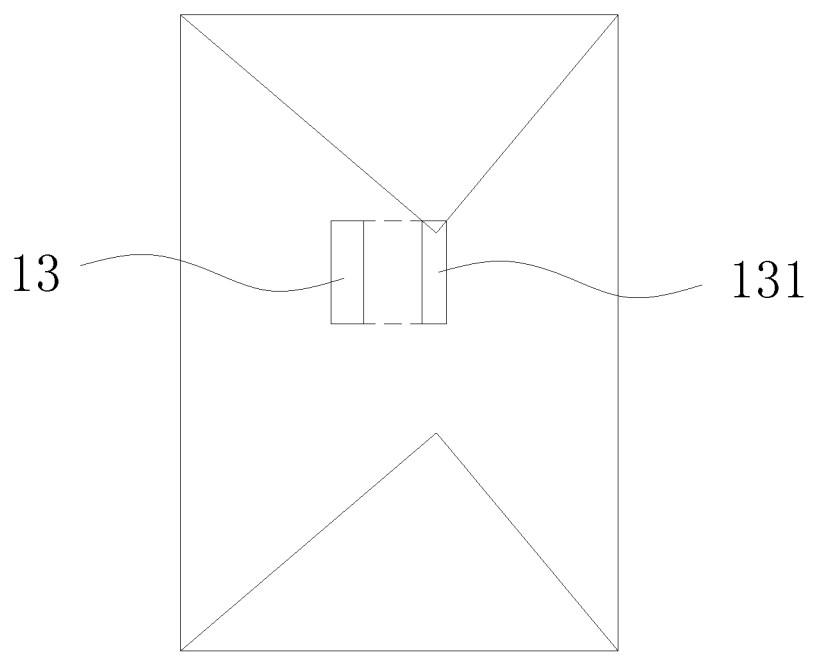
FIG. 5c is a schematic diagram of a third trip when one-way printing is performed, provided by the second embodiment of the present disclosure.

FIG. 5a is a schematic diagram of a first trip when one-way printing is performed, provided by the second embodiment of the present disclosure. FIG. 5b is a schematic diagram of a second trip when one-way printing is performed, provided by the second embodiment of the present disclosure. FIG. 5c is a schematic diagram of a third trip when one-way printing is performed, provided by the second embodiment of the present disclosure. As shown in FIG. 5a, FIG. 5b, and FIG. 5c, the printhead performs one-way movement and printing along the first trip 111, the second trip 121, and the third trip 131, respectively. At this time, in order to distinguish the printhead in different trips, it may be defined that the printhead 11 is on the first trip 111, and the printhead 12 and the printhead 13 are on the second trip 121 and the third trip 131, respectively. The printhead 11, the printhead 12, and the printhead 13 may represent the same printhead located on different trips.

Since the printhead performs the one-way printing function in this embodiment, the printing ending point of a trip will not be affected by a previous trip. At this time, the trip starting point and the trip ending point of the trip both match the boundary of the object to be printed in the trip; and as can be seen from FIG. 4, FIG. 5a, FIG. 5b and FIG. 5c, the trip starting points and trip ending points of the first trip 111, second trip 121 and third trip 131 are located near the boundary of the object to be printed, or at a position coincident with the boundary, and in this way, there is less blank printing area in the trips, which can improve printing speed and printing efficiency.

In this embodiment, when performing one-way printing, the printing method may specifically include the following steps: firstly, determining, according to layer printing data of an object to be printed, a trip starting point and/or a trip ending point in a scanning direction for each trip of multiple trips required for a printhead to print a preset layer, where a trip starting point and/or the trip ending point of at least one trip matches a boundary of the object to be printed in the trip; then performing layer printing for the preset layer according to the trips. In this way, when a single preset slice layer is printed, at least one of the trip starting point or the trip ending point of a printing trip matches the boundary of the object to be printed in the trip, which can effectively reduce an overall length of the trip, and improve printing speed and printing efficiency.

Figure 6:
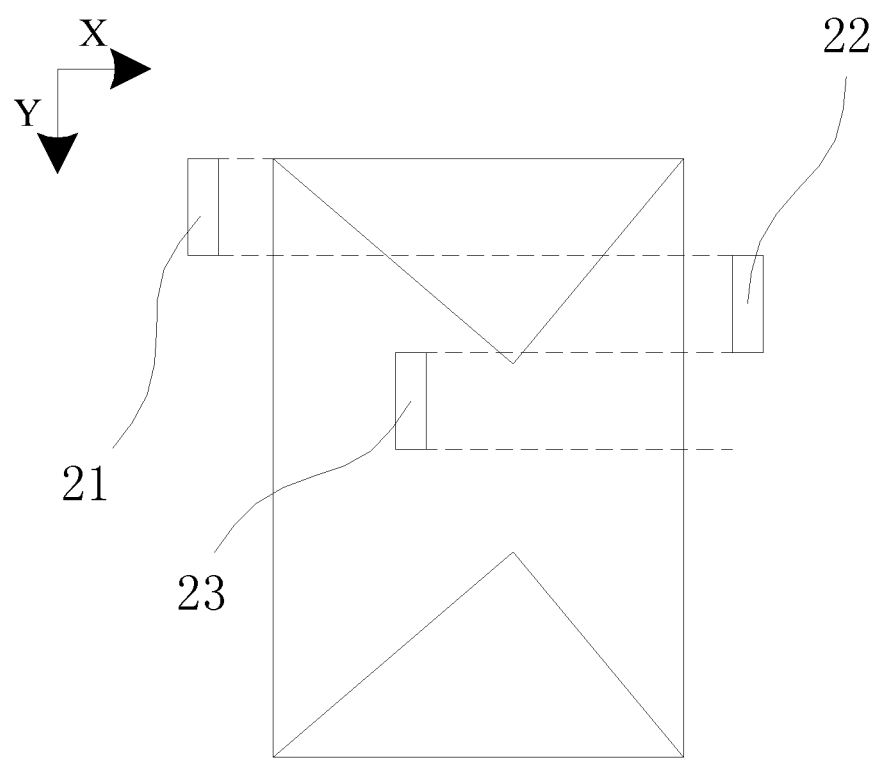
FIG. 6 is a schematic diagram of printing status when another printing method is performed, provided by a third embodiment of the present disclosure.

FIG. 6 is a schematic diagram of printing status when another printing method is performed, provided by a third embodiment of the present disclosure. As shown in FIG. 6, in this embodiment, the printhead performs a two-way printing function, that is, after printing a trip, the printhead does not return to the side of the original trip starting point, but takes the side of the trip ending point as a trip starting point to start printing the next trip in a reverse direction. Therefore, during the two-way printing, the trip in printing is limited by the position of the trip ending point of the previous s trip, and the position of the trip starting point of the next trip needs also be considered.

Figure 7A:
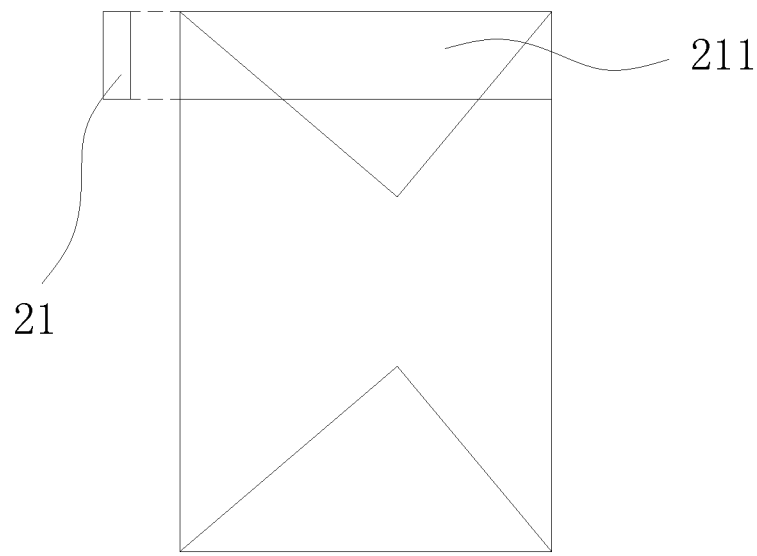
FIG. 7a is a schematic diagram of a first trip provided by the third embodiment of the present disclosure.
Figure 7B:
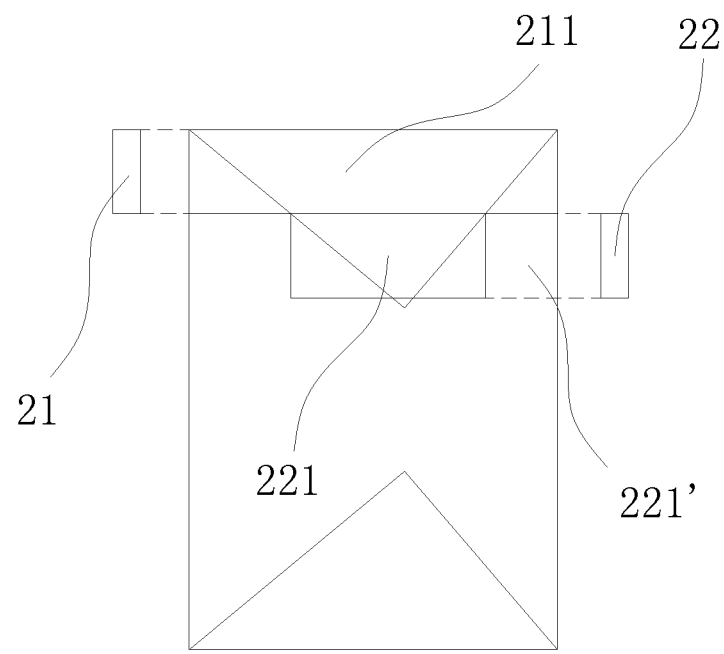
FIG. 7b is a schematic decomposition diagram of movement of a second trip provided by the third embodiment of the present disclosure.
Figure 7C:
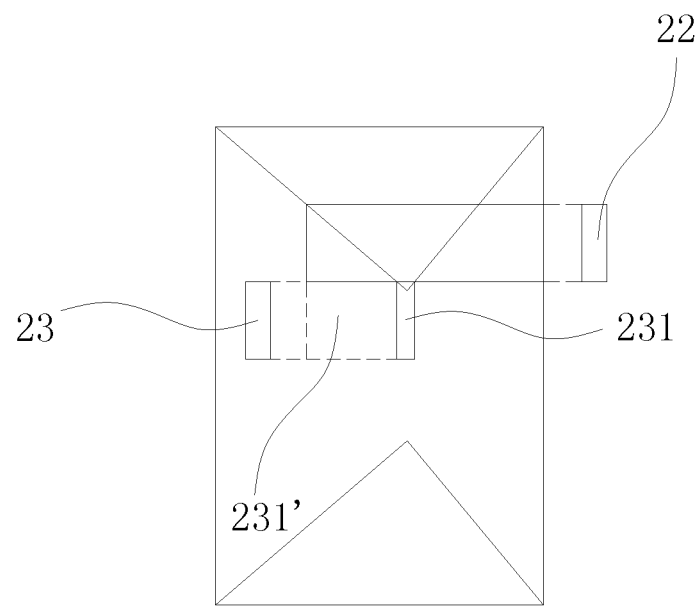
FIG. 7c is a schematic decomposition diagram of movement of a third trip provided by the third embodiment of the present disclosure.
Figure 7D:
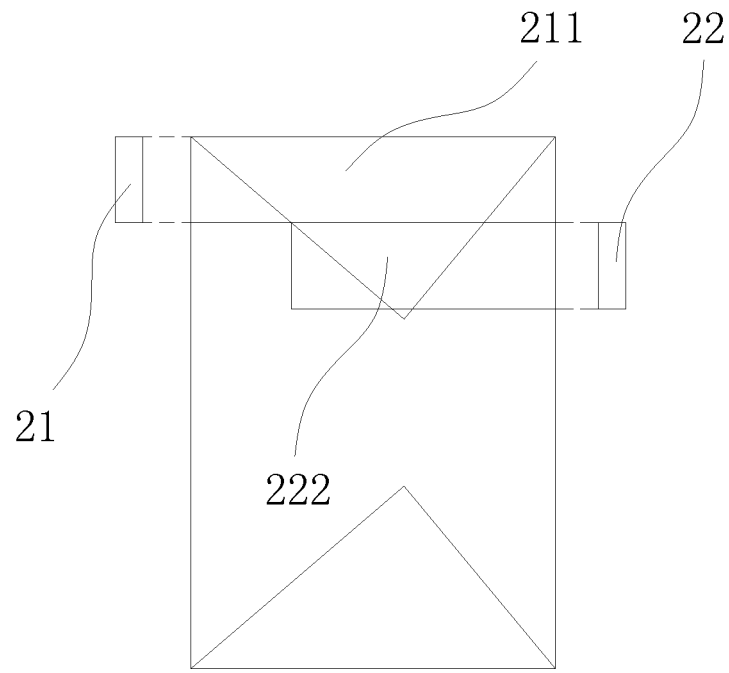
FIG. 7d is a schematic diagram of the second trip provided by the third embodiment three of the present disclosure.
Figure 7E:
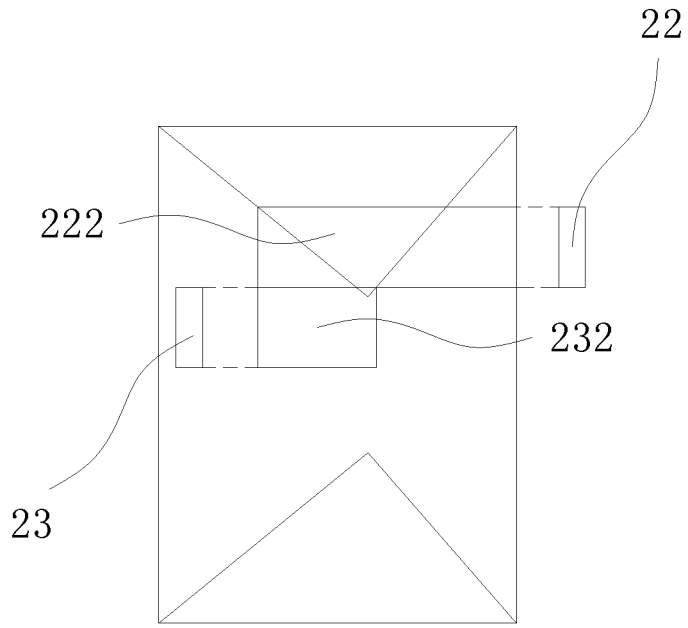
FIG. 7e is a schematic diagram of the third trip provided by the third embodiment of the present disclosure.

FIG. 7a is a schematic diagram of a first trip provided by a third embodiment of the present disclosure. FIG. 7b is a schematic decomposition diagram of movement of a second trip provided by the third embodiment of the present disclosure. FIG. 7c is a schematic decomposition diagram of movement of a third trip provided by the third embodiment of the present disclosure. FIG. 7d is a schematic diagram of the second trip provided by the third embodiment of the present disclosure. FIG. 7e is a schematic diagram of the third trip provided by the third embodiment of the present disclosure. As shown in FIG. 7a, FIG. 7b, and FIG. 7c, the printhead performs two-way movement and printing along the first trip 211, the second trip 221 and the third trip 231, respectively. At this time, similar to the foregoing second embodiment, in order to distinguish the printhead in different trips, it may be defined that the printhead 21 is on the first trip 211, and the printhead 22 and the printhead 23 are on the second trip 221 and the third trip 231, respectively. The printhead 21, the printhead 22 and the printhead 23 may represent the same printhead located on different trips.

Since the trip is limited by the position of the trip starting point or the trip ending point of two adjacent trips, its own trip starting point and trip ending point are also affected by the two upper and lower trips. Specifically, in two-way printing, the trip starting point of a trip is determined by a leading one of the contour of the object to be printed in the trip and the trip ending point of a previous trip of the trip, in the scanning direction; and the trip ending point of a trip could be determined by a lagging one of the contour of the object to be printed in the trip and the trip starting point of a next trip of the trip, in the scanning direction. For example, when determining the trip starting point of a trip, a position of the contour of the object to be printed in the trip needs to be compared with a position in the trip corresponding to the trip ending point of the previous trip of the trip to determine which one is more advanced in the scanning direction of the trip, that is, this position is used as the trip starting point when printing and then a more lagged position can be covered. Similarly, when determining the trip ending point of a trip, the position of the contour of the object to be printed in the trip needs to be compared with a position in the trip corresponding to the trip starting point of the next trip of the trip to determine which one is more lagging in the scanning direction of the trip, and that position is used as the trip ending point when printing and then a more advanced position can be covered.

For example, after completing the first trip 211, the printhead 21 steps from the trip ending point of the first trip 211 to the printhead 22 shown in the figure. Since the trip ending point of the first trip 211 lags behind the contour of the object to be printed in the second trip 222 in the scanning direction, it is necessary to print using the point corresponding to the trip ending point of the first trip 211 as the trip starting point. In this way, a deceleration path of the printhead 21 after the first trip and an acceleration path of the printhead 22 before the second trip are offset by each other, and the second trip actually passed by the printhead 22 includes a portion 221 and a portion 221' shown in FIG. 7b, which is the second trip 222 in FIG. 7d.

Similarly, the third trip actually passed by the printhead 23 includes a portion 231 and a portion 231', which is the third trip 232 in FIG. 7e.

After the range of each trip is determined in this way, the printhead can perform the printing process according to the trip data of the trips to complete printing of the preset layer.

In this embodiment, when performing two-way printing, the printing method may specifically include the following steps: firstly, determining, according to layer printing data of an object to be printed, a trip starting point and/or a trip ending point in a scanning direction for each trip of multiple trips required for a printhead to print a preset layer, where the trip starting point and/or the trip ending point of at least one trip matches a contour of the object to be printed in the trip; then performing layer printing for the preset layer according to the trips. In this way, when a single slice layer is printed, at least one of the trip starting point or the trip ending point of a printing trip matches the contour of the object to be printed in the trip, which can effectively reduce an overall length of the trip, and improve printing speed and printing efficiency.

Figure 8:
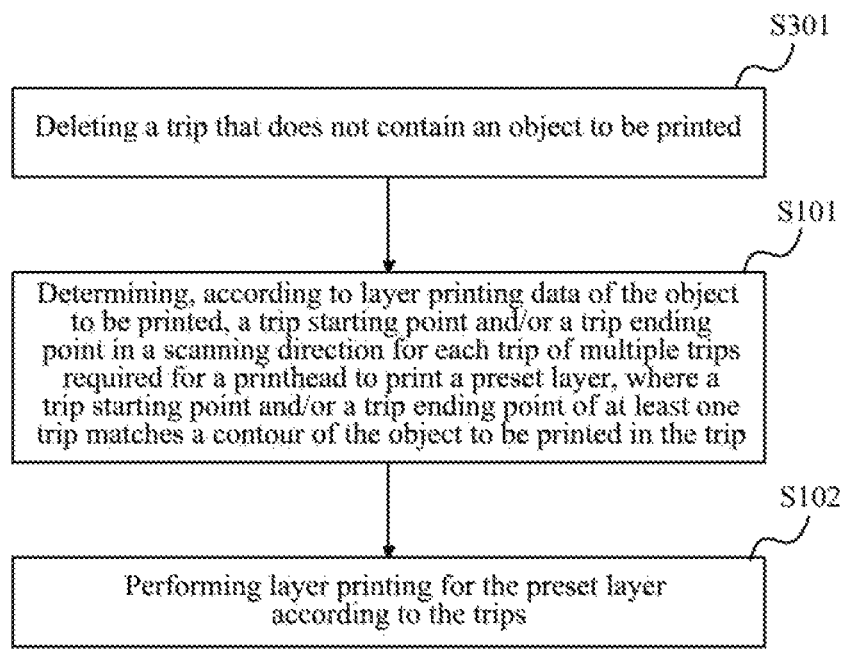
FIG. 8 is a schematic flowchart of performing a fourth printing method provided by a fourth embodiment of the present disclosure.
Figure 9:
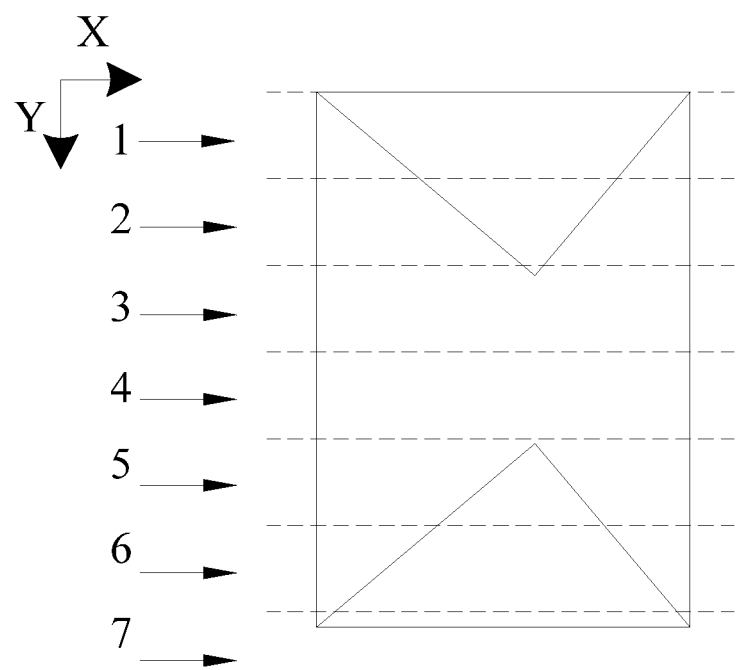
FIG. 9 is a schematic diagram of trip division when the fourth printing method is performed provided by the fourth embodiment of the present disclosure.

FIG. 8 is a schematic flowchart of performing a fourth printing method provided by a fourth embodiment of the present disclosure. FIG. 9 is a schematic diagram of trip division when the fourth printing method is performed, provided by the fourth embodiment of the present disclosure. Since portions of the object to be printed on the preset layer may be discontinuous, but divided into multiple different areas, it is possible that among the multiple trips, there will one or more trips without the object to be printed, that is, the printhead does not perform printing in the one or more trips. At this time, in order to avoid a waste of time caused by the movement of the printhead in these trips in which no printing is performed, these trips that do not contain the object to be printed can be deleted to save printing time. Specifically, if a trip does not have any portion of the object to be printed, that is, the printhead does not actually print in the trip, and then the trip is actually meaningless for the printing operation. Therefore, as shown in FIG. 8, before the determining, according to layer printing data of an object to be printed, a trip starting point and/or a trip ending point in a scanning direction for each trip of multiple trips required for the printhead to print a preset layer, the printing method further includes the following step:

S301, deleting a trip that does not contain the object to be printed.

Figure 10:
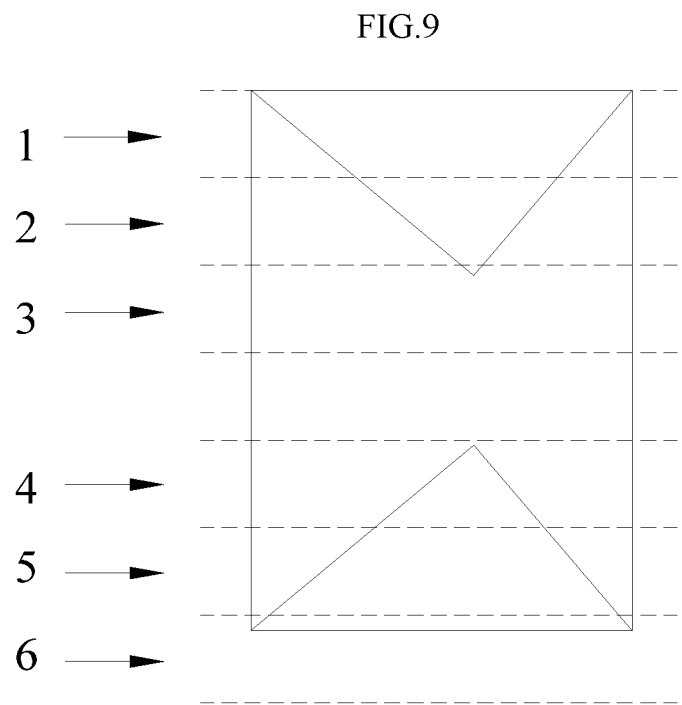
FIG. 10 is a schematic diagram of trip division of the trips in FIG. 9 after deletion.

As shown in FIG. 9, FIG. 9 includes seven trips, among which the fourth trip does not contain the object to be printed, so the fourth trip shown in FIG. 9 is a meaningless trip. Therefore, after determining the number of the multiple trips, the fourth trip that does not contain the object to be printed needs to be deleted, so that the total number of trips in the preset layer is changed from seven to six. The other trips have a portion of the object to be printed, so they need to be retained. FIG. 10 is a schematic diagram of trip division of the trips in FIG. 9 after deletion. As shown in FIG. 10, the fourth trip is deleted, so the original seven trips change to six trips.

Figure 11:
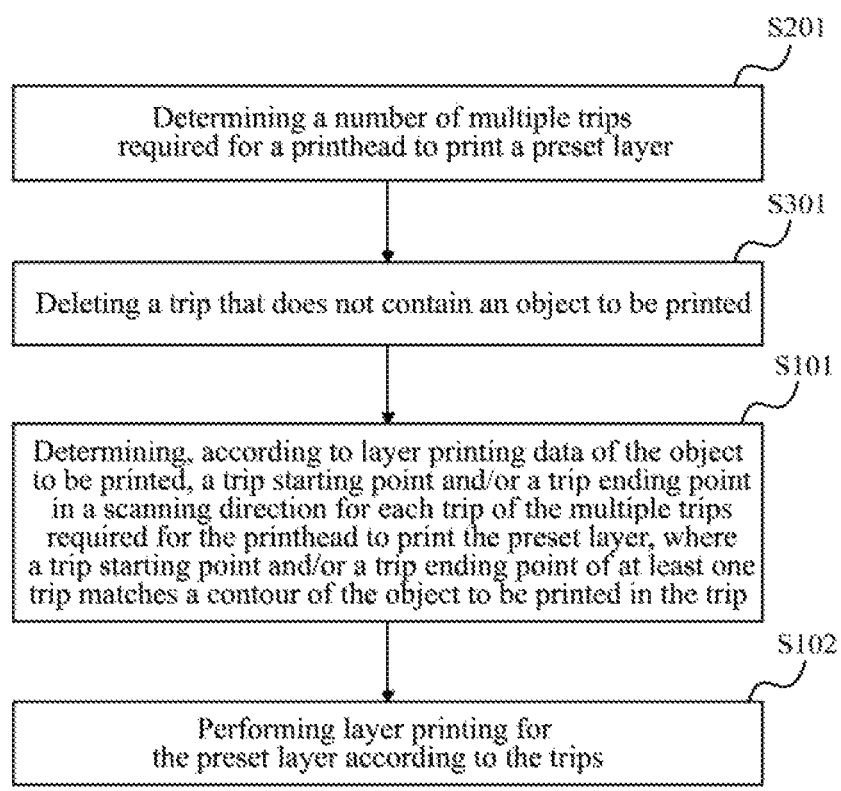
FIG. 11 is another schematic flowchart of the fourth printing method provided by the fourth embodiment of the present disclosure.

It should be noted that the step of deleting a trip that does not contain the object to be printed is generally performed after the number of trips in the preset layer is determined, so that after the number of trips is determined, the step S301 is performed for reduction. FIG. 11 is another schematic flowchart of the fourth printing method provided by the fourth embodiment of the present disclosure. As shown in FIG. 11, after step S201 is performed firstly, the step of trip deletion may be completed.

In addition, in the printing process of the same preset layer, the step of deleting the trip that does not contain the object to be printed can generally be performed one or more times. Since the printing method may have other steps of adjusting parameters, such as the number and the positions of trips, and after the steps of adjusting, there may be a blank trip that does not contain the object to be printed again, therefore, after the other steps of adjusting are completed, the step S301 can be performed again to delete all blank trips.

In this embodiment, the printing method may specifically include the following steps: firstly, determining, according to layer printing data of an object to be printed, a trip starting point and/or a trip ending point in a scanning direction for each trip of multiple trips required for a printhead to print a preset layer, where a trip starting point and/or the trip ending point of at least one trip matches a contour of the object to be printed in the trip; then performing layer printing for the preset layer according to the trips; where before the determining, according to layer printing data of an object to be printed, a trip starting point and/or a trip ending point in a scanning direction for each trip of multiple trips required for a printhead to print a preset layer, a step of deleting a trip that does not contain the object to be printed is further included. In this way, when a single slice layer is printed, at least one of the trip starting point or the trip ending point of a printing trip matches the contour of the object to be printed in the trip, which can effectively reduce an overall length of the trip, and the trip that does not contain the object to be printed can be deleted, thereby improving printing speed and printing efficiency.

Figure 12:
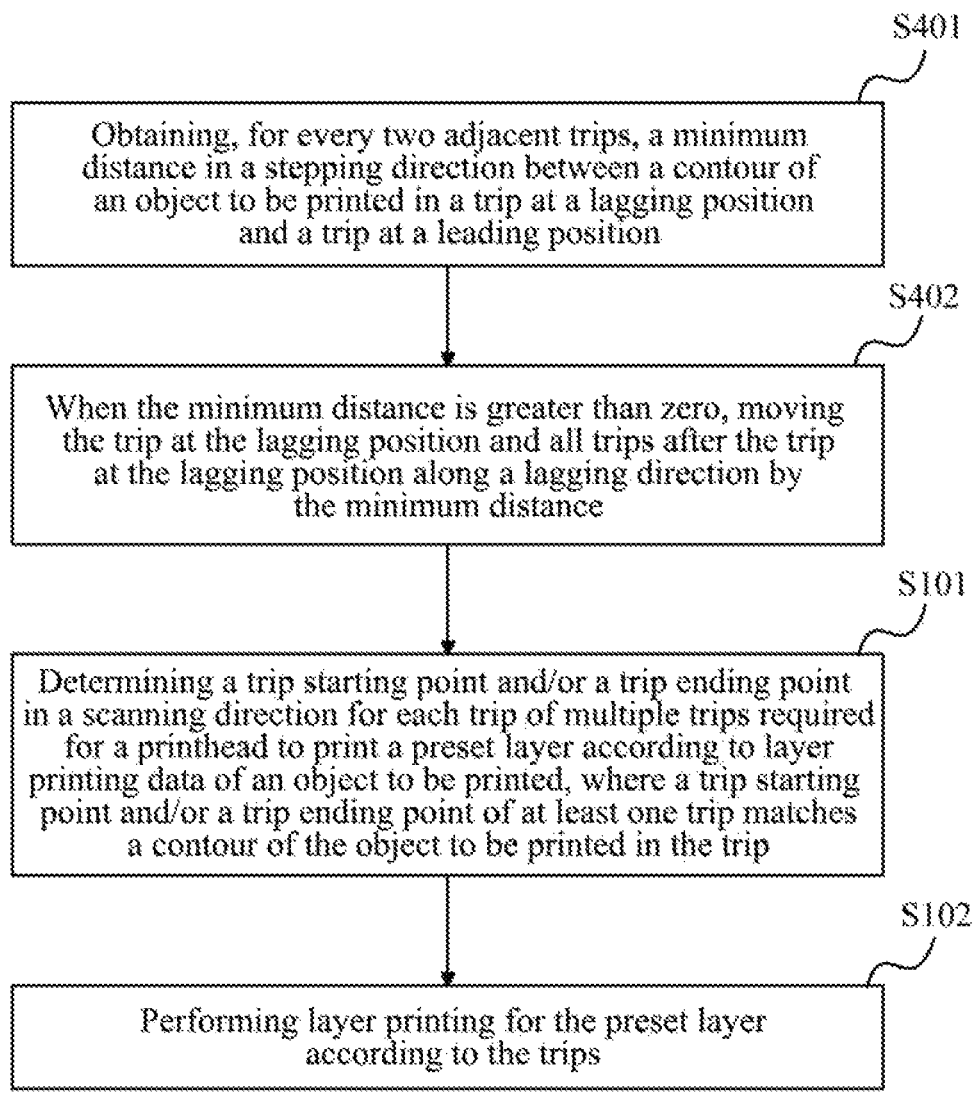
FIG. 12 is a schematic flowchart of the fourth printing method provided by the fourth embodiment of the present disclosure.
Figure 13:
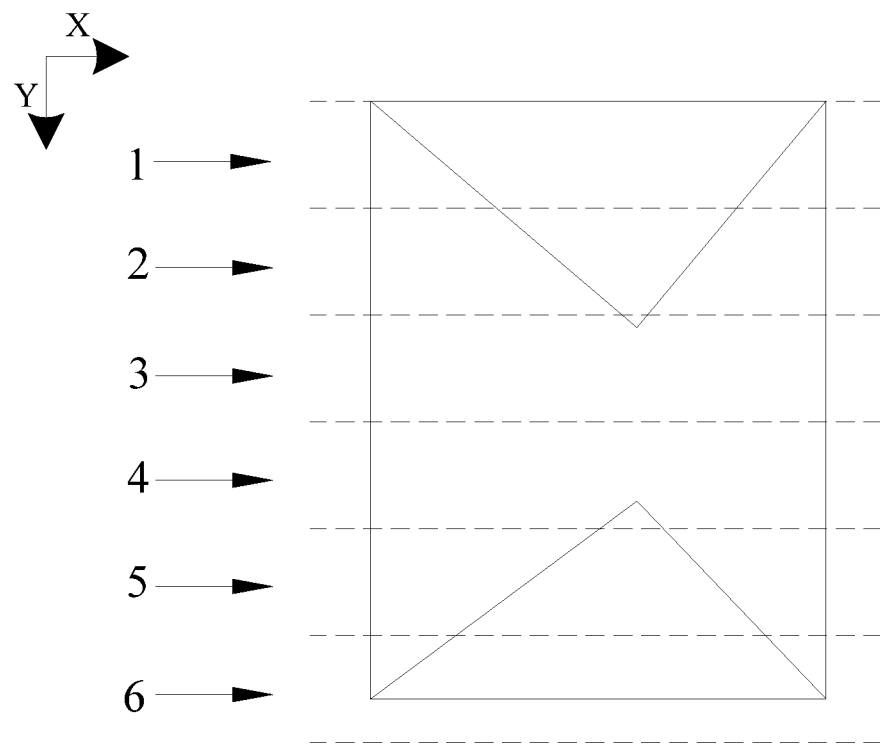
FIG. 13 is a schematic diagram of trip division of performing a fifth printing method provided by a fifth embodiment of the present disclosure.
Figure 14:
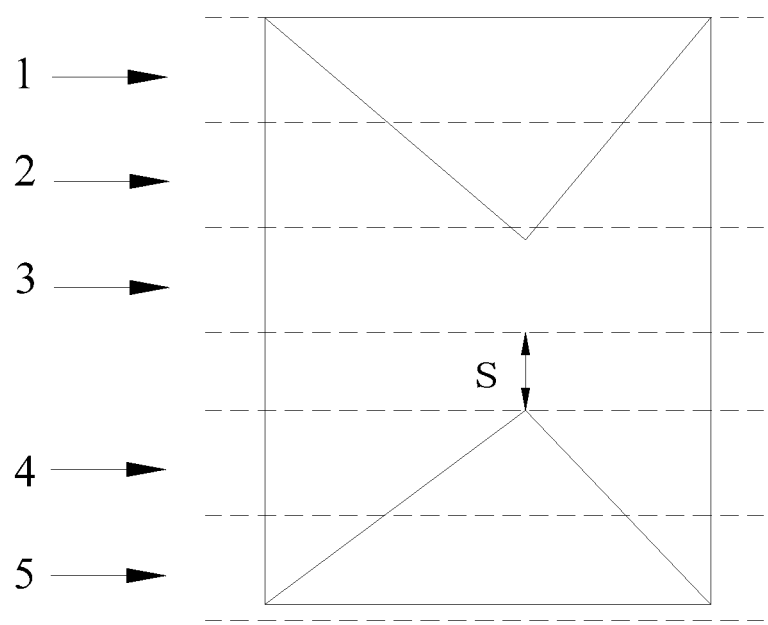
FIG. 14 is a schematic diagram of trip division of the trips in FIG. 13 after movement.

FIG. 12 is a schematic flowchart of a fifth printing method provided by a fifth embodiment of the present disclosure. FIG. 13 is a schematic diagram of trip division of performing a fifth printing method provided by the fifth embodiment of the present disclosure. FIG. 14 is a schematic diagram of trip division of the trips in FIG. 13 after movement. In this embodiment, when the object to be printed is in a discontinuous state on the preset layer, but deletion of a trip that does not contain the object to be printed cannot be performed directly, and it is also possible to move a trip along a lagging direction. Specifically, as shown in FIG. 12, before the step S101, that is, the determining, according to layer printing data of an object to be printed, a trip starting point and/or a trip ending point in a scanning direction for each trip of multiple trips required for a printhead to print a preset layer, the printing method further includes the following steps:

S401, obtaining, for every two adjacent trips, a minimum distance in a stepping direction between the contour of the object to be printed in a trip at a lagging position and a trip at a leading position.

S402, when the minimum distance is greater than zero, moving the trip at the lagging position and all trips after the trip at the lagging position along the lagging direction by the minimum distance.

In this way, since the multiple trips in the preset layer are arranged in order according to the step direction, it is possible to make a comparison between every two adjacent trips and obtain the boundary contour of the object to be printed in a trip at a lagging position in the step direction in the two adjacent trips, so as to obtain the minimum distance between the contour of the object to be printed and the boundary of the trip which is at a leading position in the step direction in the two adjacent trips. Still taking the trip division in FIG. 13 and FIG. 14 as an example for illustration. In FIG. 13, it can be determined according to the layer printing data of the preset layer that the number of trips in the layer is six. In these six trips, both the first trip and the second trip contain the object to be printed, and the object to be printed crosses over the entire width of the first trip and the second trip in the stepping direction, therefore, the minimum distance between the boundary of the object to be printed in the second trip and the boundary of the first trip is 0. Similarly, the minimum distance between the boundary of the object to be printed in the third trip and the boundary of the second trip is also 0. Therefore, the first trip, the second trip and the third trip do not need to be moved.

However, since the boundary of the object to be printed in the fourth trip is not continuous with the boundary of the object to be printed in the third trip. Therefore, the minimum distance between the boundary of the object to be printed in the fourth trip and the boundary of the third trip is the distance S between the boundary of the object to be printed in the fourth trip and the boundary between the third and fourth trips. At this time, it is necessary to move all the trips lagging behind the third trip, that is, the fourth, fifth, and sixth trips, along the lagging direction, and the distance moved is equal to the distance S, as shown in FIG. 14.

The fourth, fifth, and sixth trips in the lagging direction are compared in pairs. Since the object to be printed in each trip is connected to a trip in the leading direction, the minimum distance is always 0, that is, the fourth, fifth, and sixth trips no longer continue to move along the lagging direction.

In this way, through the above steps S401 and S402 the trip can be moved and deleted, so as to reset the number of trips and the trip starting points or trip ending points of the trips, thereby reducing waste of time during printing.

Figure 15:
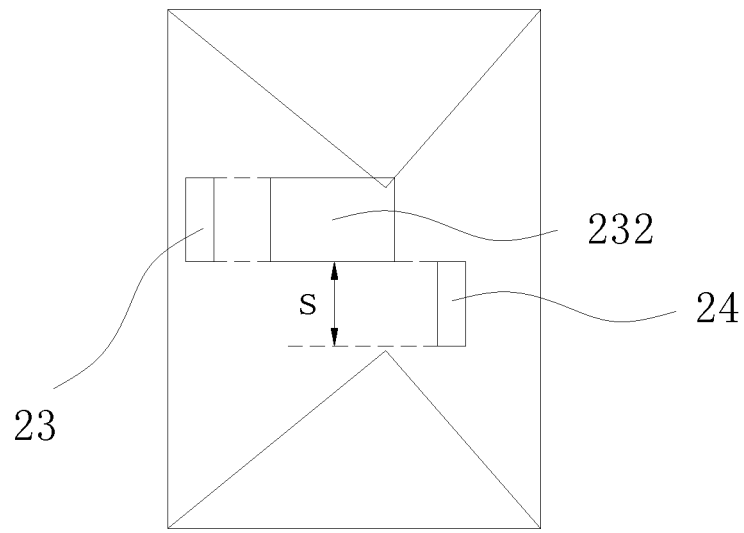
FIG. 15 is a schematic diagram of trip division of the trips before movement provided by the fifth embodiment of the present disclosure.
Figure 16:
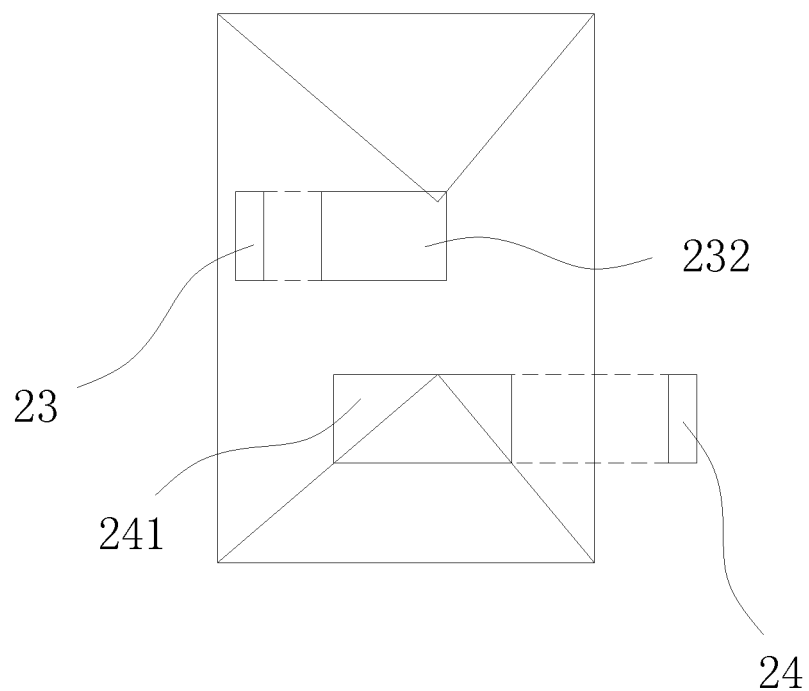
FIG. 16 is a schematic diagram of trip division of the trips in FIG. 15 after movement.

FIG. 15 is a schematic diagram of trip division of the trips before movement, provided by the fifth embodiment of the present disclosure. FIG. 16 is a schematic diagram of trip division of the trips in FIG. 15 after movement. As shown in FIG. 15 and FIG. 16, when the printhead 23 performs the third trip 232 completely and then performs the next trip, that is, the trip of the printhead 24, the trip can be moved in the lagging direction by a distance S, and the trip 241 is performed.

Figure 17A:
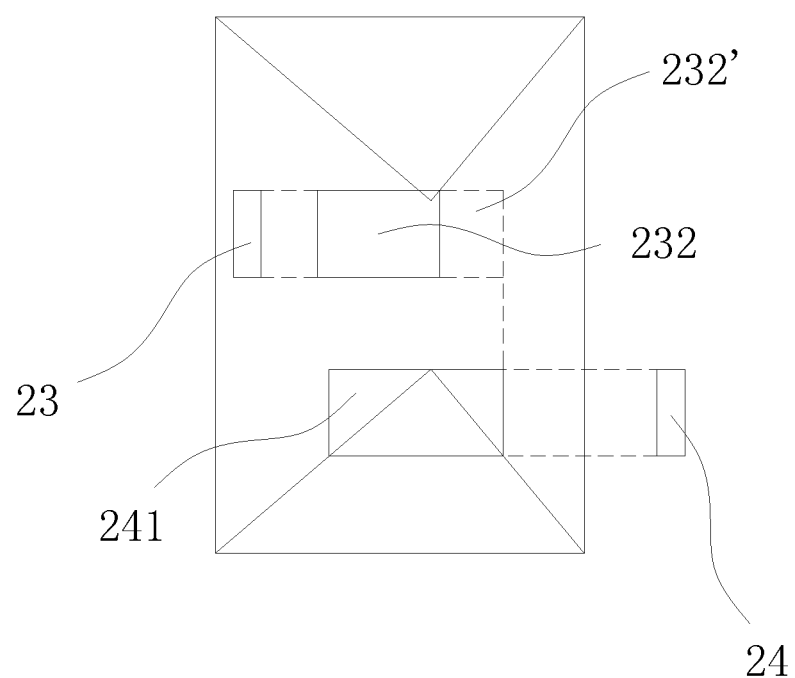
FIG. 17a is a schematic decomposition diagram of a third trip provided by the fifth embodiment of the present disclosure.
Figure 17B:
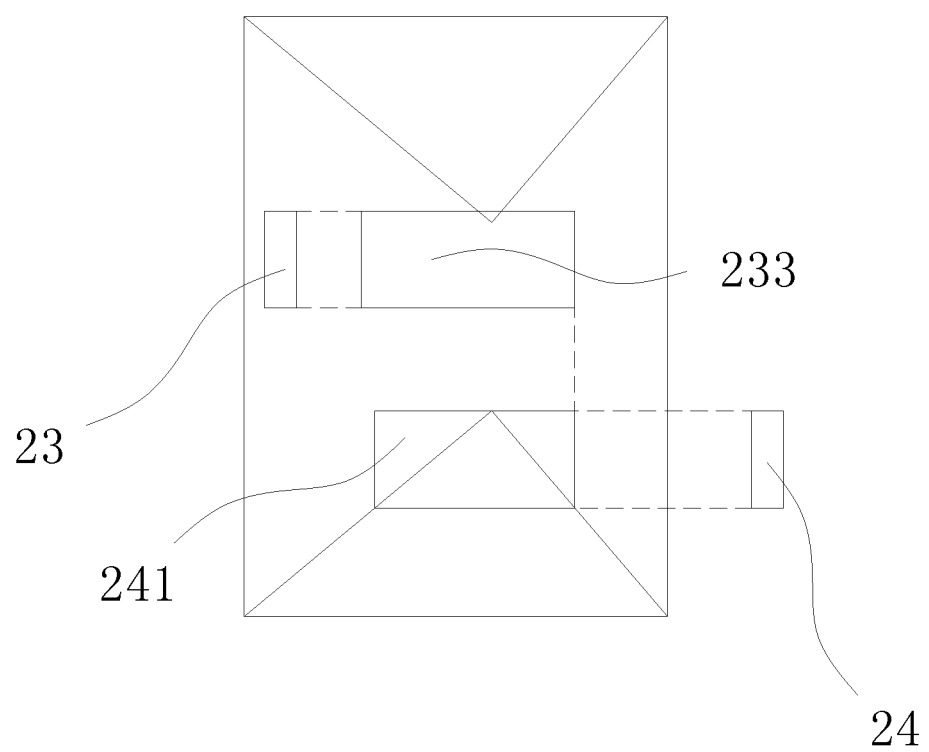
FIG. 17b is a schematic diagram of the third trip provided by the fifth embodiment of the present disclosure.
Figure 17C:
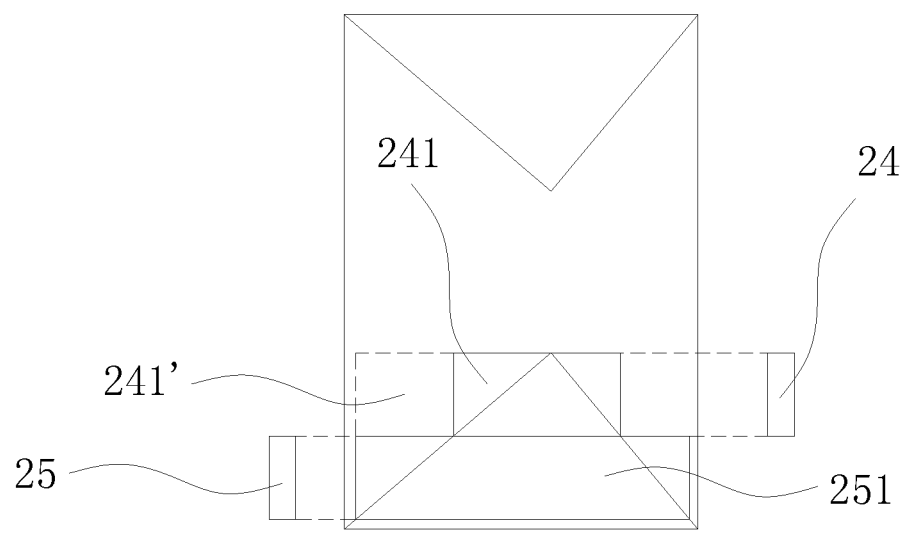
FIG. 17c is a schematic decomposition diagram of a fourth trip provided by the fifth embodiment of the present disclosure.
Figure 17D:
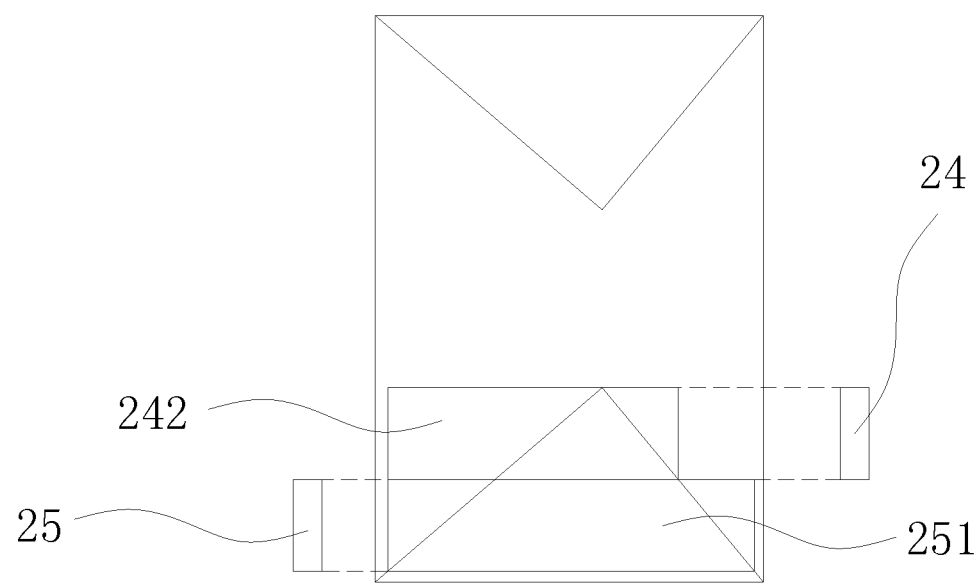
FIG. 17d is a schematic diagram of the fourth trip provided by the fifth embodiment of the present disclosure.
Figure 18:
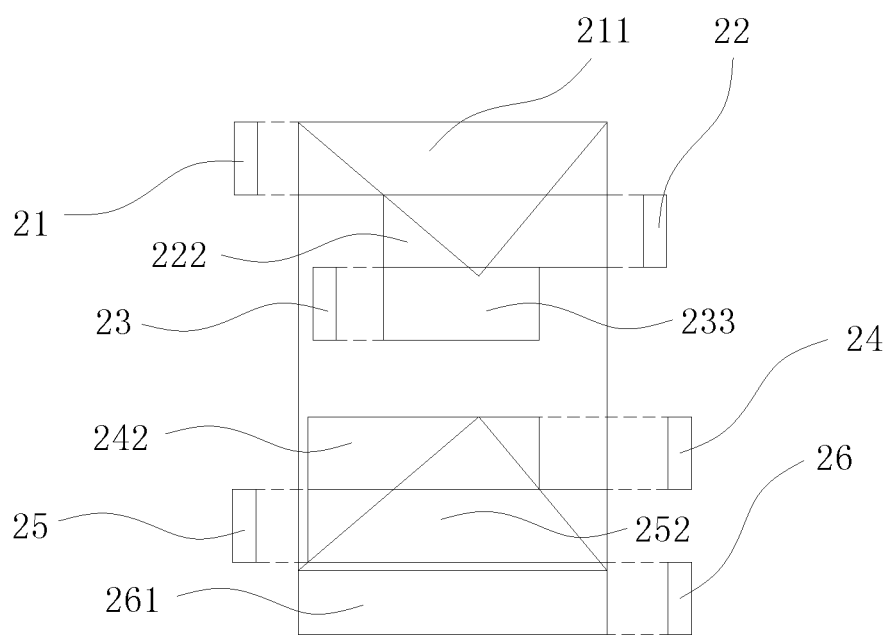
FIG. 18 is a schematic diagram of printing status provided by the fifth embodiment of the present disclosure.

After the moving of the trips, the trip starting point and trip ending point of a single trip can still be obtained according to a method similar to the foregoing embodiments. FIG. 17a is a schematic decomposition diagram of a third trip provided by the fifth embodiment of the present disclosure. FIG. 17b is a schematic diagram of the third trip provided by the fifth embodiment of the present disclosure. FIG. 17c is a schematic decomposition diagram of a fourth trip provided by the fifth embodiment of the present disclosure. FIG. 17d is a schematic diagram of the fourth trip provided by the fifth embodiment of the present disclosure. As shown in FIG. 17a to FIG. 17d, the third trip of the printhead 23 may include a portion 232 and a portion 232', that is, 233 in FIG. 17b. When the printhead performs the fourth trip, it becomes the printhead 24, and the fourth trip may include two portions of 241 and 241', namely 242 in FIG. 17d. Finally, the printhead 25 performs the fifth trip 251 to complete the printing process of the layer. The printhead 23, the printhead 24, and the printhead 25 represent a same printhead in different trips. FIG. 18 is a schematic diagram of printing status provided by the fourth embodiment of the present disclosure. As shown in FIG. 18, the first trip 211, the second trip 222, and the third trip 233 are all similar to the previous embodiments, while the fourth trip 242, the fifth trip 252 and the sixth trip 261 are located at trips after moved along the lagging direction. The printheads 21, 22, 23, 24, 25 and 26 all represent a same printhead in different trips.

In addition, the step of deleting a trip that does not contain the object to be printed in the foregoing fourth embodiment may also be performed according to the steps S401 and S402. Specifically, as shown in FIG. 14, the object to be printed is not included in the fourth trip, therefore, the minimum distance between the boundary of the object to be printed in the fourth trip and the boundary of the third trip is the entire width of the fourth trip in the stepping direction. At this time, it is necessary to move all the trips lagging behind the third trip, that is, the fourth, fifth and sixth trips, along the lagging direction, and the distance moved is equal to the minimum distance, that is, the width of the fourth trip in the stepping direction, that is, the width in the lagging direction. In this way, it is possible to avoid the trip without the object to be printed, shorten an overall printing time of the preset layer, and improve printing efficiency.

In this embodiment, the printing method may specifically include the following steps: firstly, obtaining, for every two adjacent trips, a minimum distance in a stepping direction between a contour of an object to be printed in a trip at a lagging position and a trip at a leading position; then, when the minimum distance is greater than zero, moving the trip at the lagging position and all trips after the trip at the lagging position along a lagging direction by the minimum distance; further, determining, according to layer printing data of the object to be printed, a trip starting point and/or a trip ending point in a scanning direction for each trip of multiple trips required for a printhead to print a preset layer, where the trip starting point and/or the trip ending point of at least one trip matches the contour of the object to be printed in the trip; then performing layer printing for the preset layer according to the trips. In this way, when a single slice layer is printed, at least one of the trip starting point or the trip ending point of a printing trip matches the contour of the object to be printed in the trip, which can effectively reduce an overall length of the trip, and the printing trip may not be set in the area that does not contain the object to be printed, thereby improving printing speed and printing efficiency.

Figure 19:
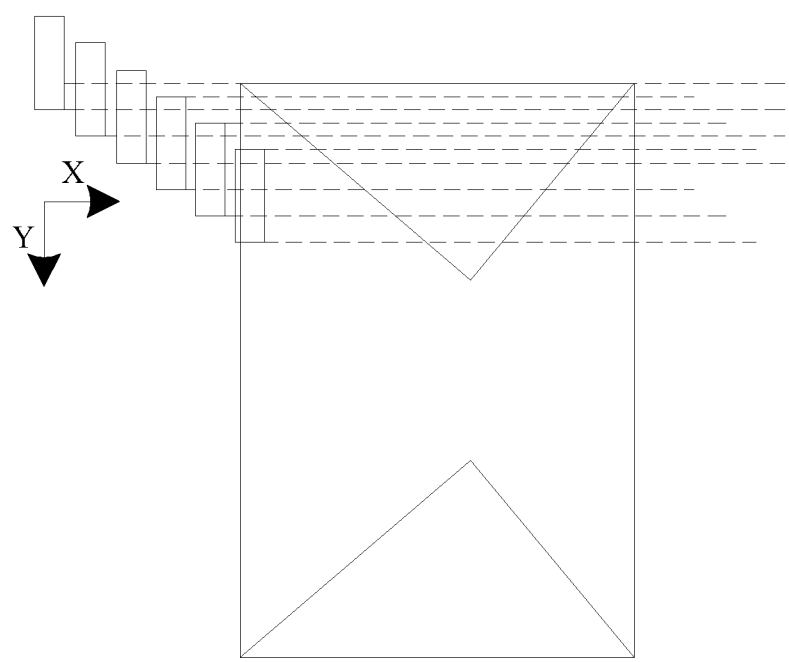
FIG. 19 is a schematic flowchart of printing status of a sixth printing method provided by a sixth embodiment of the present disclosure.
Figure 20:
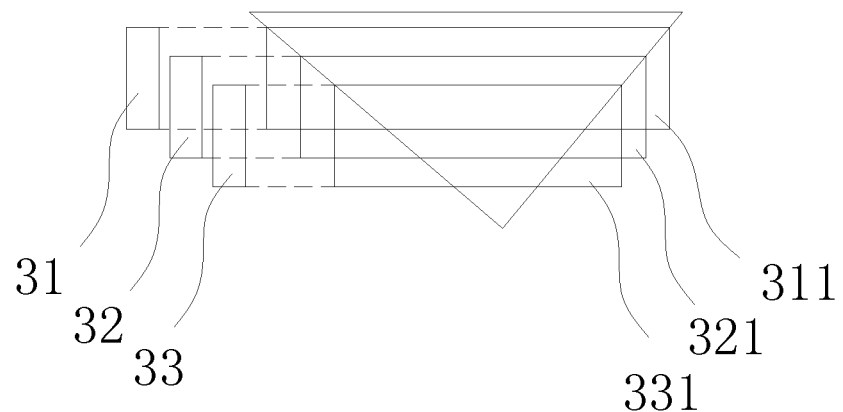
FIG. 20 is a schematic diagram of trip division of the sixth printing method provided by the sixth embodiment of the present disclosure.

FIG. 19 is a schematic diagram of printing status of a sixth printing method provided by a sixth embodiment of the present disclosure. FIG. 20 is a schematic diagram of trip division of the sixth printing method provided by the sixth embodiment of the present disclosure. As shown in FIG. 19 and FIG. 20, when performing printing, if printing resolution of the printhead itself cannot meet the resolution required for printing, a supplementary printing is required, and the method of the supplementary printing is: adding printing points between adjacent printing points on the same trip, which can be implemented in the X axis direction, that is, the scanning direction by controlling a movement speed of the printhead relative to the printing platform, and the printing resolution on the X axis is higher when the moving speed is slower, and vice versa; and in the Y-axis direction, that is, the stepping direction, it can be implemented by controlling a stepping distance of the printhead relative to the printing platform, so that the printing points of different trips are staggered. In this embodiment, in order to meet the resolution requirement of the object to be printed, a supplementary printing step may be implemented. At this time, the step of determining the number of multiple trips according to the layer printing data of the object to be printed may specifically include determining the number of the multiple trips according to the length of the printhead in the stepping direction, the length of the preset layer in the stepping direction, the resolution of the printhead and the resolution of the object to be printed.

Specifically, when determining the number of the multiple trips, the number of trips N can be obtained on the basis of the length of the printhead in the stepping direction, that is, the Y axis, the length D of the preset layer in the stepping direction, the resolution p of the printhead, and the resolution P of the object to be printed according to a first formula: $N=(D/d)*(P/p)$, where $D/d$ is rounded up to a next integer when $D/d$ is not an integer; i.e., if $D/d=1.2$, then $N=2*(P/p)$; or, the number of trips N' is obtained according to a second formula: $N'=[(D/d)*(P/p)]+(P/p)-1$, where $[(D/d)*(P/p)]$ represents rounding up $(D/d)*(P/p)$ to a next integer; i.e., if $(D/d)*(P/p)=4.8$, then $[(D/d)*(P/p)]=5$.

Figure 21A:
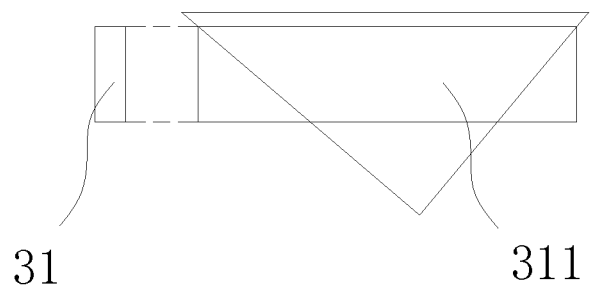
FIG. 21a is a schematic diagram of a first trip provided by the sixth embodiment of the present disclosure.
Figure 21B:
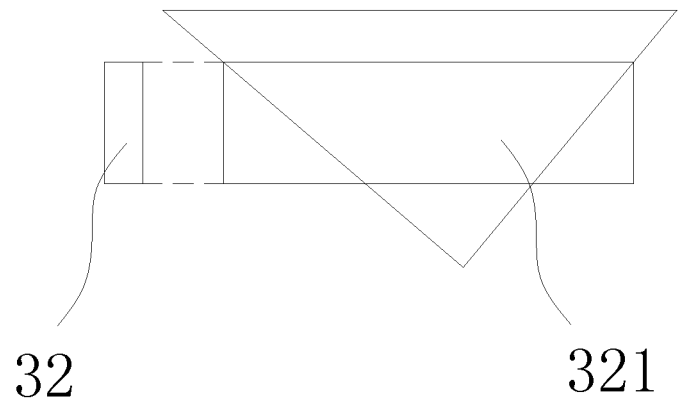
FIG. 21b is a schematic diagram of a second trip provided by the sixth embodiment of the present disclosure.
Figure 21C:
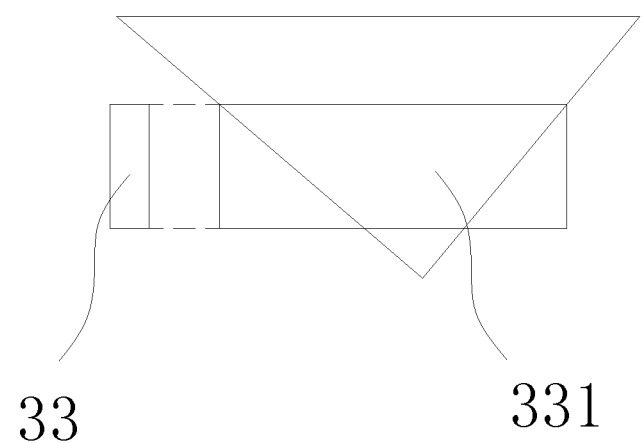
FIG. 21c is a schematic diagram of a third trip provided by the sixth embodiment of the present disclosure.

FIG. 21a is a schematic diagram of a first trip provided by the sixth embodiment of the present disclosure. FIG. 21b is a schematic diagram of a second trip provided by the sixth embodiment of the present disclosure. FIG. 21c is a schematic diagram of a third trip provided by the sixth embodiment of the present disclosure. As shown in FIG. 20, FIG. 21a, FIG. 21b and FIG. 21c, the printhead 31 prints the trip 311, the printhead 32 prints the trip 321, the printhead 33 prints the trip 331, and the printhead 31, the printhead 32 and the printhead 33 can be regarded as a same printhead on different trips.

Since this embodiment is a supplementary printing step, the number of trips required for the object to be printed on the preset layer is obtained according to the above parameters, and then the trip starting point and trip ending point of each trip are selected, respectively, to determine trip ranges of different trips. FIG. 21a, FIG. 21b and FIG. 21c respectively show the trip ranges of the printhead 31, the printhead 32 and the printhead 33 in the trip 311, trip 321 and trip 331, respectively.

After determining the trip range of each trip, the trip data of the layer can be formed, and then the printing operation can be performed by the printhead according to the trip data.

In this embodiment, when performing one-way printing and supplementary printing, the printing method may specifically include the following steps: firstly, determining, according to layer printing data of an object to be printed, a trip starting point and/or a trip ending point in a scanning direction for each trip of multiple trips required for a printhead to print a preset layer, where a trip starting point and/or the trip ending point of at least one trip matches a contour of the object to be printed in the trip; then performing layer printing for the preset layer according to the trips. In this way, when a single slice layer is printed, at least one of the trip starting point or the trip ending point of a printing trip matches the contour of the object to be printed in the trip, which can effectively reduce an overall length of the trip, and improve printing speed and printing efficiency.

Figure 22:
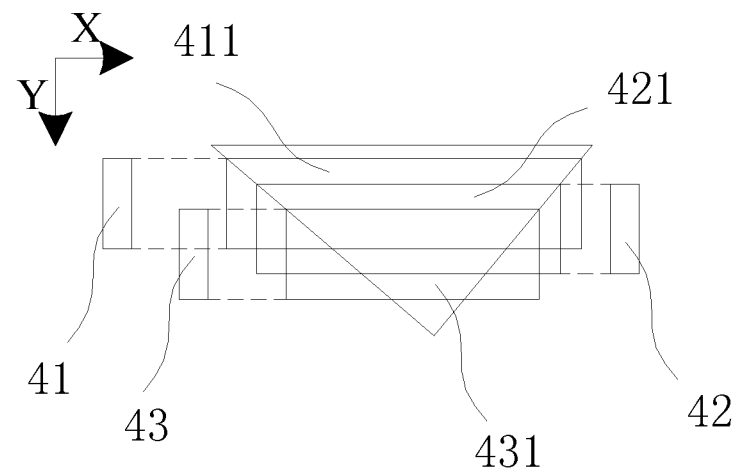
FIG. 22 is a schematic flowchart of printing status of a seventh printing method provided by a seventh embodiment of the present disclosure.

FIG. 22 is a schematic diagram of printing status of a seventh printing method provided by a seventh embodiment of the present disclosure. As shown in FIG. 22, when performing two-way printing, the printing resolution can also be improved by supplementary printing. Specifically, since it is a two-way printing mode, the trip starting point and trip ending point of the trip will be affected by both the contour of the object to be printed and the ranges of adjacent trips; and the step of determining the number of multiple trips according to the layer printing data of the object to be printed may specifically include determining the number of the multiple trips according to the length of the printhead in the stepping direction, the length of the preset layer in the stepping direction, the resolution of the printhead and the resolution of the object to be printed.

Specifically, when determining the number of the multiple trips, the number of the trips N can be obtained on the basis of the length d of the printhead in the stepping direction, that is, the Y axis, the length D of the preset layer in the stepping direction, the resolution p of the printhead, and the resolution P of the object to-be-printed according to the formula N=(D/d)*(P/p).

Figure 23A:
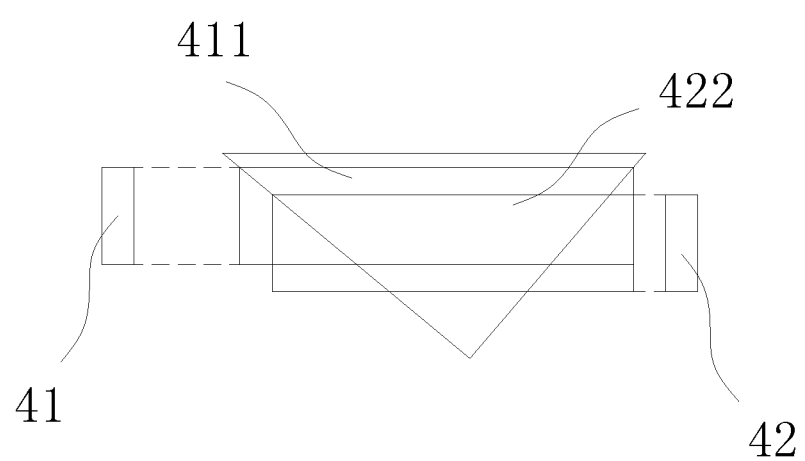
FIG. 23a is a schematic diagram of a second trip provided by the seventh embodiment of the present disclosure.
Figure 23B:
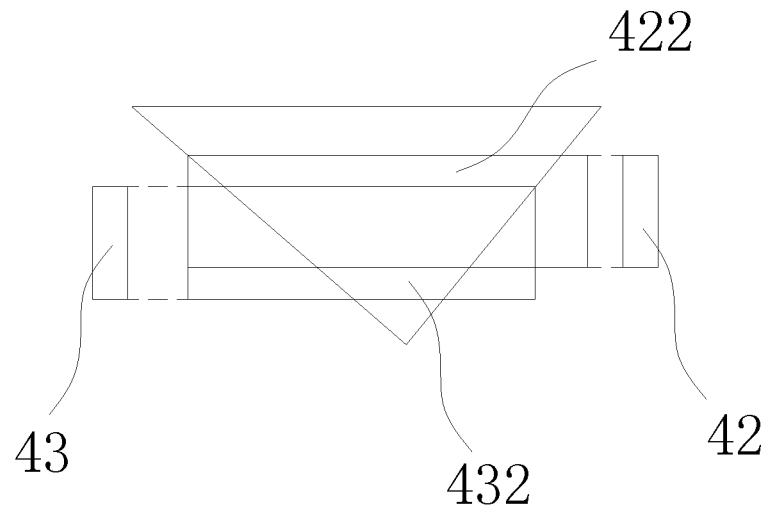
FIG. 23b is a schematic diagram of a third trip provided by the seventh embodiment of the present disclosure.

FIG. 23a is a schematic diagram of a second trip provided by the seventh embodiment of the present disclosure. FIG. 23b is a schematic diagram of a third trip provided by the seventh embodiment of the present disclosure. As shown in FIG. 22, FIG. 23a, and FIG. 23b, the printhead 41 prints the first trip 411, the printhead 42 prints the second trip 422, the printhead 43 prints the third trip 432, and the printhead 41, the printhead 42, and the printhead 43 can be regarded as a same printhead on different trips.

Since this embodiment is a supplementary printing step, the number of trips required for the object to be printed on the preset layer is obtained according to the above parameters, and then the trip starting point and trip ending point of each trip are selected to determine trip ranges of different trips. Here, the trip starting point of the trip is determined by the leading one of the contour of the object to be printed in the trip and the trip ending point of a previous trip of the trip in the scanning direction of the trip; and/or, the trip ending point of the trip is determined by the lagging one of the contour of the object to be printed in the trip and the trip starting point of a next trip of the trip in the scanning direction of the trip. FIG. 23a and FIG. 23b show the trip ranges of the printhead 41, the printhead 42 and the printhead 43 in the trips 411, 422 and 432, respectively.

Figure 24:
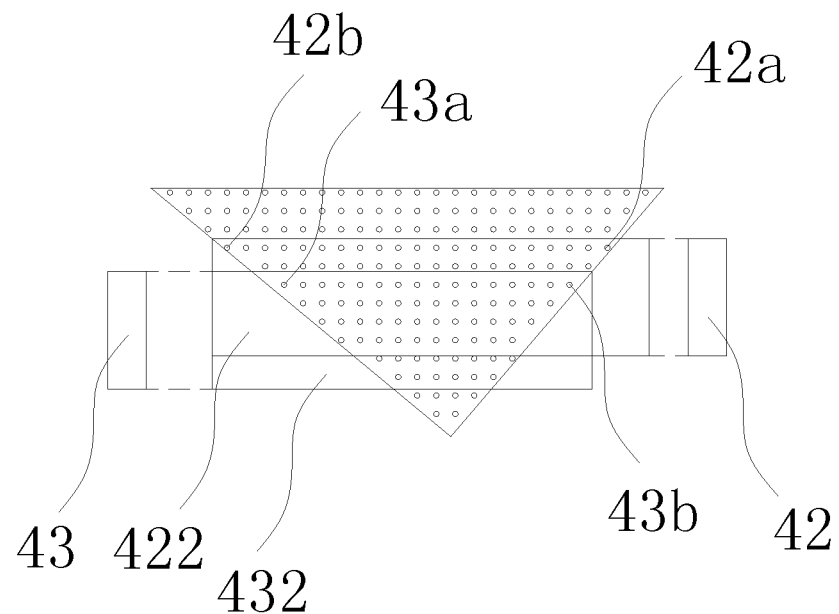
FIG. 24 is a schematic diagram of a range of printing points in the seventh embodiment of the present disclosure.

The printing method in this embodiment may also be used as an example to further explain the concept and definition of the trip starting point and trip ending point of a trip. FIG. 24 is a schematic diagram of a range of printing points in the seventh embodiment of the present disclosure. As shown in FIG. 24, since the valid printing points in a single slice layer are shown as small points in FIG. 24 (invalid printing points are not shown in the figure), therefore, in each determined trip, it is possible to select the first printing point in the trip direction in each trip as the trip starting point, and the last printing point in the trip direction in each trip as the trip ending point. Referring to FIG. 24, the trip starting point of the printhead 42 in the trip 422 is the printing point 42a and the trip ending point of the printhead 42 in the trip 422 is the printing point 42b; the trip starting point of the print head 43 in the trip 432 is the printing point 43a, and the trip ending point of the print head 43 in the trip 432 is the printing point 43b. The above-mentioned valid printing point means that the printhead responds and performs printing operation at a corresponding position, and the invalid printing point means that the printhead does not perform printing operation at the corresponding position.

After determining the trip range of each trip, the trip data of the layer can be formed, and then the printing operation can be performed by the printhead according to the trip data.

In this embodiment, when performing two-way printing and supplementary printing, the printing method may specifically include the following steps: firstly, determining, according to layer printing data of an object to be printed, a trip starting point and/or a trip ending point in a scanning direction for each trip of multiple trips required for a printhead to print a preset layer, where the trip starting point and/or the trip ending point of at least one trip matches a contour of the object to be printed in the trip; then performing layer printing for the preset layer according to the trips. In this way, when a single slice layer is printed, at least one of the trip starting point or the trip ending point of the printing trip matches the contour of the object to be printed in the trip, which can effectively reduce an overall length of the trip, and improve printing speed and printing efficiency.

Figure 25:
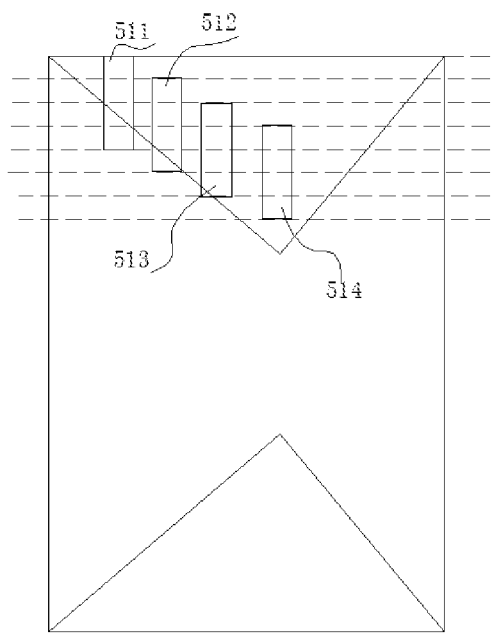
FIG. 25 is a schematic diagram of printing status of a printing method in an optional embodiment of the present disclosure.

As an optional embodiment, the number of trips N is obtained according to the first formula N=(D/d)*(P/p). The printing status is different from the sixth embodiment in that, in this optional embodiment, the length d of the printhead in the stepping direction completely enters the range of the length D of the preset layer in the first trip in the scanning direction, and the printhead moves a distance of d*(p/P) in the stepping direction in each subsequent trip. As shown in FIG. 25, taking p/P=1/4 as an example, 511 represents the position status of the printhead in the stepping direction in the first trip, and 512 represents the position status of the same printhead in the stepping direction in the second trip, 513 represents the position status of the printhead in the stepping direction in the third trip, and 514 represents the position status of the printhead in the stepping direction in the fourth trip. The method for determining the trip starting point and the trip ending point in each trip is the same as that in the sixth embodiment or the seventh embodiment, and will not be described again.

On the basis of the foregoing sixth embodiment or seventh embodiment, in the printing method of the present disclosure, the determination of the number of multiple trips required for the printhead to print the preset layer may further include: comparing the number of trips N and N'; when N>N', determining the number of trips of the current layer as N', where the printing status of the printing method at this time is as shown in the schematic diagram of FIG. 19; when N<N', determining the number of trips of the current layer as N, where the printing status of the printing method at this time is as shown in the schematic diagram of FIG. 25. When N=N', the printing status of the printing method at this time may be as shown in the schematic diagram of FIG. 19 or may be as shown in the schematic diagram of FIG. 25.

Figure 26:
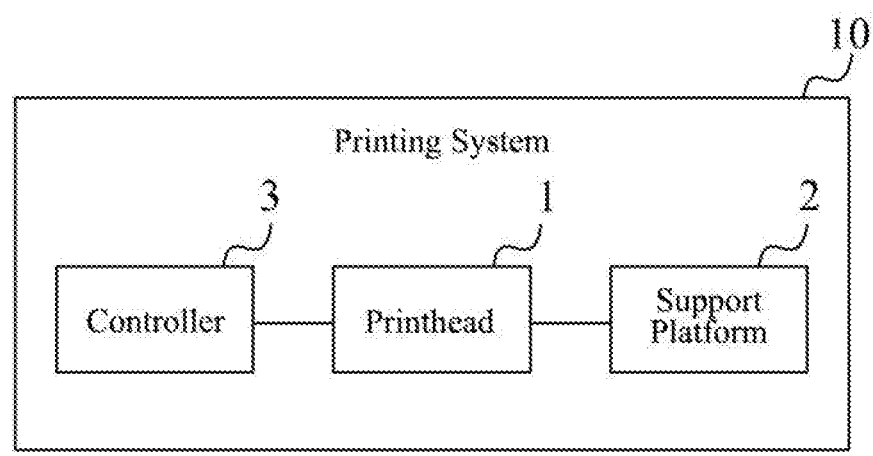
FIG. 26 is a schematic structural diagram of a printing system provided by an eighth embodiment of the present disclosure.

In addition, the present disclosure also provides a printing system capable of performing the printing methods in the foregoing first to seventh embodiments to perform the printing steps of a 3D object. FIG. 26 is a schematic structural diagram of a printing system provided by an eighth embodiment of the present disclosure. As shown in FIG. 26, the printing system 10 provided by this embodiment includes a printhead 1, a support platform 2 and a control unit 3. The control unit 3 is electrically connected to the printhead L and the control unit 3 is configured to perform the printing method according to the foregoing first embodiment to seventh embodiments, to cause the printhead 1 to print an object to be printed on the support platform 2.

Specifically, the control unit 3 may include components such as a processing terminal and a drive controller. The processing terminal can be used to process the object to be printed to form printing data for printing, and the drive controller controls the printhead 1 to print on the support platform 2 by an instruction issued by the processing terminal. The instruction issued by the processing terminal includes printing the object to be printed according to the method flow in the first to seventh embodiments.

Specifically, the layer printing data includes, and is not limited to, layer structure data and layer non-structure data, and the layer structure data includes, and is not limited to, information such as column structure data, grid structure data, and spiral structure data.

Further, the functions of the processing terminal and the drive controller may be implemented by hardware, software executed by a processor, or a combination of the two. Specifically, if implemented by a software module, a program can be pre-burned into the processor, or the software can be installed into a preset system; if implemented by hardware, the corresponding function can be fixed and implemented by using field programmable gate array (FPGA).

Further, the software module may be stored in a RAM memory, a flash memory, a ROM memory, an EPROM memory, a hard disk, or any other form of storage medium known in the art. By coupling the storage medium to a processor, the processor can read information from the storage medium and can write information to the storage medium. As a variation, the storage medium may be a component of the processor, or both the processor and the storage medium are located on an application specific integrated circuit (ASIC).

Further, the hardware may be a general-purpose processor capable of implementing specific functions, a digital signal processor (DSP), an application specific integrated circuit (ASIC), a field programmable gate array (FPGA) or other programmable logic devices, discrete gates or transistor logic devices, discrete hardware components, or a combination of these hardware. As a variation, it can also be implemented by a combination of computing devices, for example, a combination of a DSP and a microprocessor, a combination of multiple microprocessors, a combination of one or more microprocessors communicatively coupled with a DSP, and so on.

The printing system provided in this embodiment includes a printhead, a support platform, and a control unit. The control unit is electrically connected to the printhead, and the control unit is configured to perform the printing method to cause the printhead to print an object to be printed on the support platform, and the printing method may specifically include the following steps: firstly, determining, according to layer printing data of an object to be printed, a trip starting point and/or a trip ending point in a scanning direction for each trip of multiple trips required for a printhead to print a preset layer, where the trip starting point and/or the trip ending point of at least one trip matches a contour of the object to be printed in the trip; then performing layer printing for the preset layer according to the trips. In this way, when a single slice layer is printed, at least one of the trip starting point or the trip ending point of a printing trip matches the boundary of the object to be printed in the trip, which can effectively reduce an overall length of the trip, and improve printing speed and printing efficiency.

Those of skilled in the art could understand that all or part of the steps of the foregoing method embodiments may be completed by a program instructing relevant hardware. The aforementioned program may be stored in a computer-readable storage medium. When the program is executed, steps including the foregoing method embodiments are executed; and the foregoing storage medium includes various media that can store program code, such as a ROM, a RAM, a magnetic disk, or an optical disk.

Finally, it should be noted that the above embodiments are only used to illustrate the technical solutions of the present disclosure, rather than limiting it; although the present disclosure has been described in detail with reference to the foregoing embodiments, those skilled in the art should understand: they can still modify the technical solutions described in the foregoing embodiments, or equivalently replace some or all of the technical features; however, these modifications or substitutions do not deviate the essence of the corresponding technical solutions from the scope of the technical solutions of the embodiments of the disclosure.

What is claimed is:

1. A printing method, comprising:
   determining, by a processor of a printing device, a number of multiple trips required for a print head to print a preset layer;
   determining, by the processor of the printing device, according to layer printing data of an object to be printed, a trip starting point and/or a trip ending point in a scanning direction for each trip of multiple trips required for the print head to print the preset layer, wherein the trip starting point and/or the trip ending point of at least one of the multiple trips matches a contour of the object to be printed in the at least one of the multiple trips;
   wherein the number of the multiple trips required for the print head to print the preset layer is N, N>1, and
   wherein, for the second trip to the N trip, for every two adjacent trips, the trip starting point of the at least one of the multiple trips is determined by a leading one of the contour of the object to be printed in the at least one of the multiple trips and the trip ending point of a former trip of the at least one of the multiple trips in the scanning direction of the at least one of the multiple trips; and/or, for the first to the N−1 trip, for every two adjacent trips, the trip ending point of the at least one of the multiple trips is determined by a lagging one of the contour of the object to be printed in the at least one of the multiple trips and the trip starting point of a next trip of the at least one of the multiple trips in the scanning direction of the at least one of the multiple trips;
   performing, by the processor of the printing device, layer printing for the preset layer according to the multiple trips;
   wherein the performing, by the processor of the printing device, layer printing for the preset layer according to the multiple trips comprises:
   generating, by the processor of the printing device, a trip data of the multiple trips;
   sending, by the processor of the printing device, the trip data to the print head to perform a printing step;
   wherein before the determining, by the processor of the printing device, according to layer printing data of an object to be printed, a trip starting point and/or a trip ending point in a scanning direction for each trip of multiple trips required for a print head to print the preset layer, the method further comprises:
   deleting, by the processor of the printing device, all trips that do not comprise the object to be printed; and
   obtaining, by the processor of the printing device, for every two adjacent trips, a minimum distance in a stepping direction between the contour of the object to be printed in a trip at a lagging position and a trip at a leading position, wherein the two adjacent trips are every two adjacent trips of the multiple trips arranged in order according to a step direction; and
   when the minimum distance is greater than zero, moving, by the processor of the printing device, the trip at the lagging position and all trips after the trip at the lagging position along a lagging direction by the minimum distance.

2. The printing method according to claim 1, wherein the trip starting point and the trip ending point of the at least one of the multiple trips match the contour of the object to be printed in the at least one of the multiple trips.

3. The printing method according to claim 1, wherein the determining, by the processor of the printing device, according to layer printing data of an object to be printed, a trip starting point and/or a trip ending point for each trip of multiple trips required for a print head to print the preset layer, specifically comprises:

determining, by the processor of the printing device, according to a range of an area having an object contour in the scanning direction in the each trip of the multiple trips, the trip starting point and/or the trip ending point of the each trip of the multiple trips.

4. The printing method according to claim 1, wherein the determining, by the processor of the printing device, a number of the multiple trips required for the print head to print the preset layer specifically comprises:

determining, by the processor of the printing device, the number of the multiple trips according to a length of the print head in a stepping direction and a length of the preset layer in the stepping direction.

5. The printing method according to claim 1, wherein the determining, by the processor of the printing device, a number of the multiple trips required for the print head to print the preset layer specifically comprises:

determining, by the processor of the printing device, the number of the multiple trips according to a length of the print head in a stepping direction, a length of the preset layer in the stepping direction, resolution of the print head and resolution of the object to be printed.

6. The printing method according to claim 5, wherein the determining, by the processor of the printing device, the number of the multiple trips required for the print head to print the preset layer specifically further comprises: comparing different numbers of the trips, and taking a minimum value as the number of the multiple trips required for the preset layer.

* * * * *